United States Patent
Iida et al.

(10) Patent No.: US 10,132,219 B2
(45) Date of Patent: Nov. 20, 2018

(54) EMISSION CONTROL SYSTEM AND EMISSION CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Masahide Iida, Toyota (JP); Itsuya Kurisaka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 171 days.

(21) Appl. No.: 15/236,702

(22) Filed: Aug. 15, 2016

(65) Prior Publication Data

US 2017/0051647 A1 Feb. 23, 2017

(30) Foreign Application Priority Data

Aug. 21, 2015 (JP) .................... 2015-164225

(51) Int. Cl.
*F01N 3/08* (2006.01)
*F01N 3/36* (2006.01)
*F01N 9/00* (2006.01)

(52) U.S. Cl.
CPC ......... *F01N 3/0885* (2013.01); *F01N 3/0814* (2013.01); *F01N 3/0842* (2013.01);
(Continued)

(58) Field of Classification Search
CPC .... F01N 3/0814; F01N 3/0842; F01N 3/0885; F01N 3/36; F01N 9/00; F01N 2260/04;
(Continued)

(56) References Cited

U.S. PATENT DOCUMENTS

2011/0079001 A1* 4/2011 Sakurai ............ B01D 53/9422
60/295
2012/0131908 A1* 5/2012 Bisaiji .................. F01N 3/2033
60/276
(Continued)

FOREIGN PATENT DOCUMENTS

CN 103534149 A 1/2014
EP 2541009 A1 1/2013
(Continued)

*Primary Examiner* — Brandon Lee
(74) *Attorney, Agent, or Firm* — Oliff PLC

(57) ABSTRACT

An emission control system and method execute a regeneration control such that a catalyst device recovers from poisoning, in a first control mode in which a temperature raising operation and a releasing operation are alternately repeated and in a second control mode in which the temperature raising operation and the releasing operation are alternately repeated. In the first control mode, the temperature raising operation is performed by post injection from a fuel injector. In the second control mode, the temperature raising operation is performed by adding fuel into exhaust gas from an addition valve such that the HC concentration in exhaust gas oscillates with an amplitude within a first specified range and a cycle within a second specified range. The control mode is switched from the first control mode to the second control mode during the regeneration control.

5 Claims, 17 Drawing Sheets

(52) U.S. Cl.
CPC ................ *F01N 3/36* (2013.01); *F01N 9/00* (2013.01); *F01N 2260/04* (2013.01); *F01N 2430/06* (2013.01); *F01N 2430/08* (2013.01); *F01N 2570/04* (2013.01); *F01N 2570/14* (2013.01); *Y02T 10/47* (2013.01)

(58) Field of Classification Search
CPC ............. F01N 2430/06; F01N 2430/08; F01N 2570/04; F01N 2570/14; Y02T 10/47
See application file for complete search history.

(56) References Cited

U.S. PATENT DOCUMENTS

| | | | |
|---|---|---|---|
| 2012/0144807 A1* | 6/2012 | Sobue | F01N 3/0814 60/286 |
| 2013/0291522 A1 | 11/2013 | Bisaiji et al. | |
| 2014/0105799 A1 | 4/2014 | Bisaiji et al. | |
| 2016/0010527 A1 | 1/2016 | Miyake | |

FOREIGN PATENT DOCUMENTS

| | | |
|---|---|---|
| EP | 2 846 028 A1 | 3/2015 |
| JP | 2010-112200 A | 5/2010 |
| JP | 2010-196569 A | 9/2010 |
| JP | 4893876 B2 | 3/2012 |
| JP | 2015-045260 A | 3/2015 |
| WO | 2012/098688 A1 | 7/2012 |
| WO | 2014/128969 A1 | 8/2014 |

* cited by examiner

EMISSION CONTROL SYSTEM AND EMISSION CONTROL METHOD FOR INTERNAL COMBUSTION ENGINE

INCORPORATION BY REFERENCE

The disclosure of Japanese Patent Application No. 2015-164225 filed on Aug. 21, 2015 including the specification, drawings and abstract is incorporated herein by reference in its entirety.

BACKGROUND

1. Technical Field

The disclosure relates to an emission control system and an emission control method for an internal combustion engine.

2. Description of Related Art

An emission control system for an internal combustion engine, which includes a catalyst device of a NOx storage reduction type, is known. This type of catalyst device stores nitrogen oxides (NOx) in exhaust gas when burned gas that was burned at a lean air-fuel ratio flows into the device, and releases the stored NOx when burned gas that was burned at a rich air-fuel ratio that is richer than the stoichiometric air-fuel ratio flows into the device. Further, when hydrocarbon (HC) is supplied to this type of catalyst device when NOx is released, the catalyst device reduces and removes the released NOx, using the hydrocarbon as a reductant. Thus, in the emission control system including the catalyst device of the NOx storage reduction type, storage of NOx under lean air-fuel ratios, and release and reduction of NOx under rich air-fuel ratios are alternately repeated, so that emission of NOx to the ambient air is curbed.

In Japanese Patent No. 4893876, an emission control system for an internal combustion engine is disclosed which permits NOx to be subjected to continuous aftertreatment under lean air-fuel ratios, by intermittently adding fuel into exhaust gas for continuous aftertreatment, such that the concentration of HC in exhaust gas flowing into a catalyst device of a NOx storage reduction type oscillates with an amplitude within a specified range and a cycle within a specified range.

In the catalyst device of the NOx storage reduction type, sulfur in exhaust gas is stored along with NOx. Since the sulfur stored in the catalyst device cannot be released under a temperature condition under which NOx is normally released, the amount of sulfur stored in the catalyst device (sulfur storage amount) gradually increases, when the NOx aftertreatment is simply continued by repeating storage and release/reduction of NOx as described above. Then, the sulfur thus stored affects the NOx storage capability of the catalyst device, and induces deterioration of the NOx aftertreatment performance. Therefore, in the emission control system including the catalyst device as described above, when the sulfur storage amount increases to a certain extent, a regeneration control is performed so as to release the stored sulfur and regenerate the catalyst device. The regeneration control is carried out by alternately performing a temperature raising operation to raise the temperature of the catalyst device to a temperature at which sulfur can be released, by burning unburned fuel supplied to exhaust gas through post injection, or the like, in the catalyst device, and a releasing operation to release sulfur by making the air-fuel ratio rich.

Since the temperature at which sulfur can be released is higher than a temperature region in which NOx can be stored, NOx cannot be stored during the temperature raising operation of the regeneration control. On the other hand, continuous aftertreatment of NOx under lean air-fuel ratios through the fuel addition as described above can be conducted in a high temperature region; therefore, when the temperature raising operation is performed through the fuel addition for continuous aftertreatment, the NOx aftertreatment can be continued even during the temperature raising operation.

SUMMARY

However, it is necessary to perform fuel addition at rather long intervals, so as to perform continuous aftertreatment of NOx under lean air-fuel ratios, and an upstream-side end portion of the catalyst device on which exhaust gas blows directly is cooled, in the periods between each addition. Therefore, in the temperature raising operation through the fuel addition for continuous aftertreatment, the temperature of the upstream-side end portion of the catalyst device may be insufficiently raised, which may result in insufficient regeneration.

The embodiments provide emission control system and method for an internal combustion engine which can favorably recover the capability of the catalyst device to convert and remove nitrogen oxides, which capability was reduced by sulfur poisoning, while curbing emission of nitrogen oxides during regeneration control.

A first aspect provides an emission control system and method for an internal combustion engine, the internal combustion engine including a cylinder and an exhaust passage, exhaust gas emitted from the cylinder flowing in the exhaust passage. The emission control system comprises a fuel injection valve configured to perform post injection of fuel into the cylinder after a combustion stroke in the internal combustion engine; a fuel addition valve provided in the exhaust passage and configured to add unburned fuel into the exhaust gas; a catalyst device provided downstream of the fuel addition valve in the exhaust passage, the catalyst device being configured to reduce nitrogen oxides in the exhaust gas through reaction of the nitrogen oxides with hydrocarbon, the catalyst device including a noble-metal catalyst supported on a contact surface that contacts with the exhaust gas, and the catalyst device including an exhaust-gas contact surface around the noble-metal catalyst, the exhaust-gas contact surface being a basic surface, the catalyst device reducing the nitrogen oxides in the exhaust gas when a hydrocarbon concentration in the exhaust gas flowing into the catalyst device is oscillated with an amplitude within a first specified range, and a cycle within a second specified range that is longer than a cycle of inflow of the exhaust gas into the exhaust passage during idling of the internal combustion engine, the catalyst device increasing a storage amount of the nitrogen oxides when an oscillation cycle of the hydrocarbon concentration of the exhaust gas is made longer than the second specified range; and an electronic control unit. The electronic control unit is configured to execute regeneration control such that the catalyst device recovers from sulfur poisoning, when a sulfur storage amount of the catalyst device is equal to or larger than a specified start determination value; in the regeneration control, alternately and repeatedly perform a temperature raising operation and a releasing operation, the temperature raising operation raising a temperature of the catalyst device to a temperature required for release of the sulfur stored in the catalyst device, and the releasing operation controlling an air-fuel ratio of an air-fuel mixture burned in the cylinder to a value required for release of the sulfur stored in the catalyst device; perform the regeneration control in a first control mode and in a second control mode, the first control mode being a mode in which the temperature raising operation and the releasing operation are alternately repeated while the temperature raising operation is performed through execution of the post injection by the fuel injection valve, the second control mode being a mode in which the temperature raising operation and the releasing operation are alternately repeated while the temperature raising operation is performed by executing addition of unburned fuel by the fuel addition valve, such that the hydrocarbon concentration in the exhaust gas flowing into the catalyst device oscillates with the amplitude within the first specified range and the cycle within the second specified range; and perform the regeneration control in the second control mode after performing the regeneration control in the first control mode.

In the control in the first control mode, the temperature raising operation is performed by executing post injection by the fuel injection valve. At this time, exhaust gas containing unburned fuel components is discharged into the exhaust passage each time each cylinder of the internal combustion engine enters the exhaust stroke; therefore, the unburned fuel components flow into the catalyst device with a relatively short cycle or at relatively short intervals, and the temperature of an upstream-side end portion of the catalyst device on which exhaust gas blows directly is likely to be increased. However, since it is necessary, for release of sulfur, to increase the catalyst temperature to be higher than a temperature range in which nitrogen oxides can be stored, nitrogen oxides (NOx) cannot be stored during the temperature raising operation, under the control in the first control mode, and emission of NOx to the ambient air cannot be curbed. During control in the first control mode, sulfur released from the upstream-side end portion of the catalyst device is carried by exhaust gas to a downstream-side portion of the catalyst device. Therefore, regeneration from sulfur poisoning starts from the front end side of the catalyst device, and proceeds while shifting toward the rear end with a lapse of time.

On the other hand, under the control in the second control mode, the temperature raising operation is performed while NOx in exhaust gas is kept in a condition where it can be reduced, by executing addition of unburned fuel by the fuel addition valve, such that the HC concentration of exhaust gas flowing into the catalyst device oscillates with the amplitude within the specified range and the cycle within the specified range. Since the reduction of NOx at this time can be conducted even in a high temperature region, emission of NOx to the ambient air can also be curbed during the temperature raising operation. However, it is necessary to add unburned fuel at some intervals, so as to keep NOx in a condition where it can be reduced, and the upstream-side end portion of the catalyst device on which exhaust gas blows directly is cooled in a period between each addition, thus making it difficult to raise the temperature. Therefore, in the control in the second control mode, the upstream-side end portion of the catalyst device may not be sufficiently regenerated from sulfur poisoning, and the NOx conversion/removal capability of the catalyst device may be insufficiently recovered under the regeneration control. Accordingly, when the regeneration control is performed only through control in the second control mode, the NOx emission amount during the regeneration control may be reduced, but the NOx emission amount after the regeneration control may be increased, as compared with the case where the regeneration control is performed only through control in the first control mode.

In this respect, in the emission control system of the internal combustion engine as described above, during regeneration control, the control in the second control mode is carried out, after control is performed in the first control mode, during the regeneration control. In this case, after sulfur stored in the upstream-side end portion of the catalyst device, which portion is less likely or unlikely to be regenerated under control in the second control mode, is released under control in the first control mode, sulfur in the remaining downstream-side portion of the catalyst device is released under control in the second control mode, so that the catalyst device as a whole can be favorably recovered from sulfur poisoning. Furthermore, since NOx can be reduced and removed during control in the second control mode, the NOx emission amount during the regeneration control can be reduced, as compared with the case where the control is performed only in the first control mode. Accordingly, in the emission control system of the internal combustion engine as described above, it is possible to favorably recover the NOx conversion/removal capability of the catalyst device, which was reduced by sulfur poisoning, while curbing emission of NOx during regeneration control.

Since it is difficult to regenerate the upstream-side end portion of the catalyst device from sulfur poisoning, under control in the second control mode as described above, it is desirable to switch to the control in the second control mode, at the time when poisoning release in the upstream-side end portion of the catalyst device has sufficiently proceeded under control in the first control mode. In the meantime, the progress of regeneration can be grasped from the amount of reduction of the sulfur storage amount as measured from the start of the regeneration control.

Another aspect relates to the emission control system according to the first aspect, wherein the electronic control unit is configured to perform switching from the first control mode to the second control mode, when the sulfur storage amount is reduced to a specified switching determination value, during the regeneration control, the specified switching determination value being smaller than the start determination value.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

In the following, one embodiment of an emission control system of an internal combustion engine will be described in detail with reference to FIG. 1-FIG. 27. Initially, the configuration of the emission control system of the internal combustion engine of this embodiment will be described. The emission control system of this embodiment is used in a vehicle-mounted diesel engine including an exhaust-gas turbine type supercharger.

Figure 1:
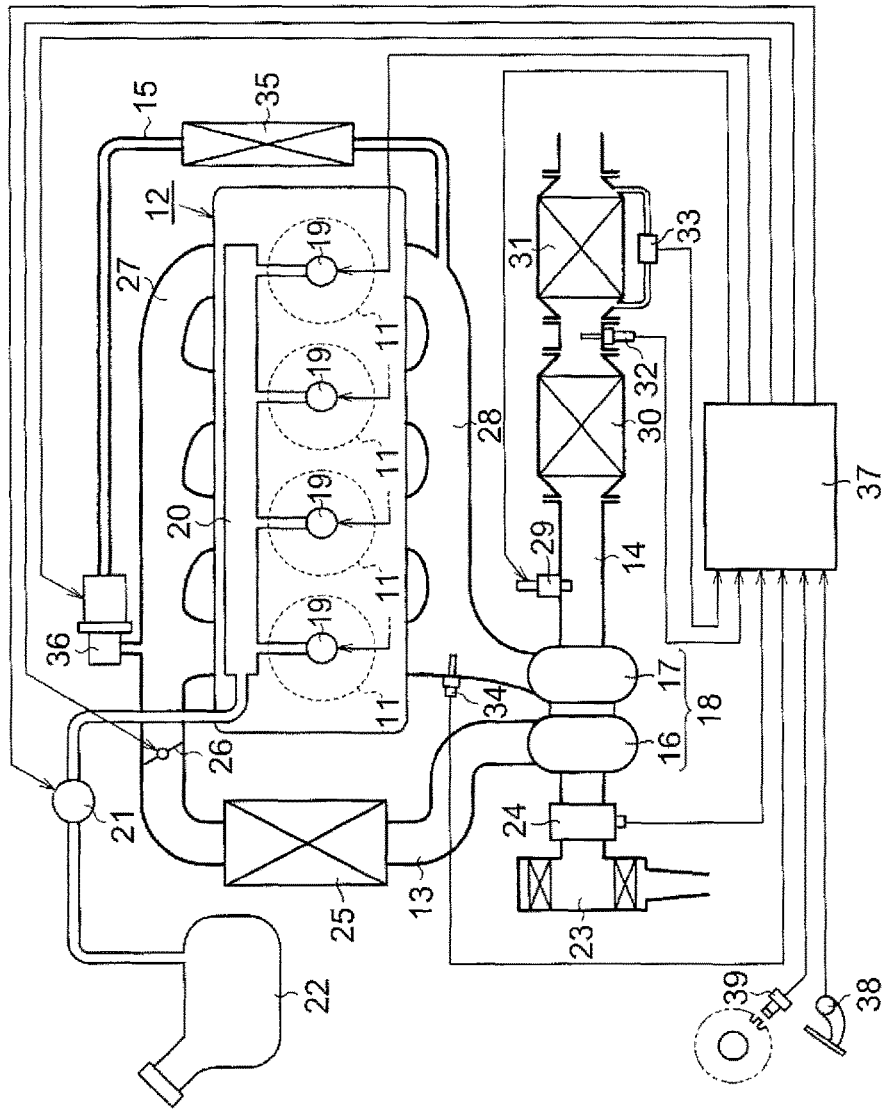
FIG. 1 is a schematic view schematically showing the configuration of one embodiment of an emission control system of an internal combustion engine.

As shown in FIG. 1, the diesel engine in which the emission control system of this embodiment is used has a plurality of cylinders 11 in which air-fuel mixtures are burned. While the diesel engine having four cylinders 11 is shown in FIG. 1, the number of cylinders 11 is not limited to this example. The diesel engine includes an engine body 12 in which the respective cylinders 11 are formed, an intake passage 13 through which intake air to be drawn into each cylinder 11 flows, an exhaust passage 14 through which exhaust gas emitted from each cylinder 11 flows, and a recirculated exhaust-gas passage (EGR passage 15) through which exhaust gas is recirculated from the exhaust passage 14 into the intake passage 13. The diesel engine further includes an exhaust-gas turbine type supercharger 18 having a compressor 16 provided in the intake passage 13, and a turbine 17 provided in the exhaust passage 14. The turbine 17 is rotated by rush of exhaust gas flowing in the exhaust passage 14, and drives the compressor 16. Then, the compressor 16 compresses and discharges intake air according to the driving.

Each of the cylinders 11 of the engine body 12 is provided with a fuel injection valve 19 that injects fuel into the cylinder 11. The fuel injection valve 19 of each cylinder 11 is connected to a common rail 20. The common rail 20 is connected to a fuel tank 22, via an electronically controlled fuel pump 21 capable of changing the discharge amount. The fuel pump 21 sucks and pressurizes fuel in the fuel tank 22, and supplies the fuel to the common rail 20. Then, the fuel supplied from the common rail 20 is distributed and supplied to the respective fuel injection valves 19.

In a portion of the intake passage 13 located upstream of the compressor 16, an air cleaner 23 that filters out foreign matters in intake air, and an air flow meter 24 for detecting the flow rate (intake air amount GA) of intake air flowing in the intake passage 13 are provided. Also, in a portion of the intake passage 13 located downstream of the compressor 16, an intercooler 25 that cools the intake air whose temperature has been elevated due to compression by the compressor 16, and a throttle valve 26 as a valve for adjusting the intake air amount GA are provided. The intake passage 13 branches into the respective cylinders 11, in an intake manifold 27 connected to the engine body 12.

The exhaust passage 14 includes an exhaust manifold 28 connected to the engine body 12, and exhaust gases emitted from the respective cylinders 11 join together in the exhaust manifold 28. The above-mentioned turbine 17 is provided in a portion of the exhaust passage 14 located downstream of the exhaust manifold 28.

The emission control system of the diesel engine as described above includes a fuel addition valve 29 that adds unburned fuel into exhaust gas flowing in the exhaust passage 14, a catalyst device 30 for converting and removing nitrogen oxides (NOx) in the exhaust gas, and a PM filter 31 that traps particulate matter (PM) in the exhaust gas. The fuel addition valve 29 is installed in a portion of the exhaust passage 14 located downstream of the turbine 17, and the catalyst device 30 is installed in a portion of the exhaust passage 14 located downstream of the fuel addition valve 29. The PM filter 31 is installed in a portion of the exhaust passage 14 located downstream of the catalyst device 30. Further, an exhaust gas temperature sensor 32 for detecting the temperature (post-catalyst exhaust gas temperature T1) of exhaust gas immediately after it passed through the catalyst device 30, and a differential pressure sensor 33 for detecting a pressure difference of exhaust gas before and after its passage through the PM filter 31 are installed in the exhaust passage 14. Also, an air-fuel ratio sensor 34 for detecting the air-fuel ratio of air-fuel mixtures burned in the respective cylinders 11 is mounted to the exhaust manifold 28 of the exhaust passage 14.

In this diesel engine, an EGR passage 15 is provided for connecting the exhaust manifold 28 with the intake manifold 27. In the EGR passage 15, an EGR cooler 35 that cools exhaust gas (EGR gas) recirculated through the EGR passage 15 from the exhaust passage 14 into the intake passage 13, and an EGR valve 36 that adjusts the flow rate of the EGR gas, are provided.

Further, the emission control system of this embodiment includes an electronic control unit 37. The electronic control unit 37 includes a central processing unit that performs various computations for control of the emission control system, a read-only memory in which programs and data used for control are stored, a readable and writable memory in which computation results of the central processing unit and detection results of sensors are temporarily stored, an input port, and an output port. The input port of the electronic control unit 37 receives output signals of the above-described air flow meter 24, exhaust gas temperature sensor 32, differential pressure sensor 33, and the air-fuel ratio sensor 34. Also, the input port of the electronic control unit 37 receives output signals of an accelerator pedal position sensor 38 for detecting the amount of depression of an accelerator pedal by a driver, and a crank angle sensor 39 that outputs a pulse signal according to rotation of a crankshaft as an output shaft of the diesel engine. On the other hand, drive circuits of the fuel injection valves 19, fuel pump 21, throttle valve 26, fuel addition valve 29, and the EGR valve 36 are connected to the output port of the electronic control unit 37. The electronic control unit 37 obtains by computation the engine speed NE from the output signal of the crank angle sensor 39, and the engine load factor KL from the output signal of the accelerator pedal position sensor 38, etc.

Also, the electronic control unit 37 obtains the temperature (catalyst temperature TC) of the catalyst device 30 from the post-catalyst exhaust gas temperature T1 detected by the exhaust gas temperature sensor 32. More specifically, the amount of reduction of the exhaust gas temperature from the time when exhaust gas passes through the catalyst device 30 to the time when it reaches the location where the exhaust gas temperature sensor 32 is installed is obtained, based on the outside air temperature and the traveling speed of the vehicle on which the diesel engine is installed, and the catalyst temperature TC is calculated as a value obtained by adding the amount of reduction from the post-catalyst exhaust gas temperature T1.

Next, the catalyst device 30 provided in the above-described emission control system will be described in detail. The catalyst device 30 includes a substrate including an exhaust-gas channel through which exhaust gas flows, and a catalyst support is supported on a surface of the exhaust-gas channel.

Figure 2:
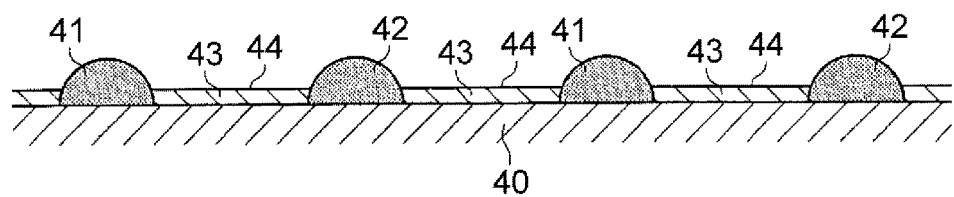
FIG. 2 is a cross-sectional view showing, in enlargement, a cross-sectional structure around a surface of an exhaust channel in a substrate of a catalyst device provided in the emission control system of the embodiment.

FIG. 2 shows an enlarged cross-sectional structure of the substrate of the catalyst device 30 in the vicinity of the surface of the exhaust-gas channel. As shown in FIG. 2, catalyst particles 41, 42 of noble metals are supported on the catalyst support 40 supported on the surface of the exhaust-gas channel. In this embodiment, as the noble-metal catalyst particles 41, 42, catalyst particles 41 of platinum (Pt) and catalyst particles 42 of rhodium (Rh) are supported on the catalyst support 40. In this connection, catalyst particles of palladium (Pd) can be used as noble-metal catalyst particles supported on the catalyst support 40, and the catalyst particles of palladium may be further supported in addition to the catalyst particles 41, 42 of platinum and rhodium, or the catalyst particles of palladium may be supported in place of the catalyst particles 42 of rhodium.

On the other hand, the catalyst support 40 is formed of alumina, for example, and a basic layer 43 is formed on its surface. The basic layer 43 contains at least one selected from alkali metals, such as potassium (K), sodium (Na), and cesium (Cs), alkaline-earth metals, such as barium (Ba) and calcium (Ca), rare earths, such as lanthanoid, and metals, such as silver (Ag), copper (Cu), iron (Fe), and iridium (Ir), which can supply electrons to NOx.

In the catalyst device 30, exhaust gas flows along the surface of the catalyst support 40 supported on the surface of the exhaust-gas channel; thus, the catalyst particles 41, 42 are supported on an exhaust-gas flow surface of the catalyst device 30. Also, a surface of the basic layer 43 that shows a property as a base provides an exhaust-gas contact surface portion 44. The exhaust-gas contact surface portion 44 is a basic surface.

The catalyst device 30 as described above is able to convert NOx in exhaust gas, by the following two methods. In a first NOx-aftertreatment method, NOx in exhaust gas is converted and removed, by oscillating the concentration of hydrocarbon (HC) of exhaust gas flowing into the catalyst device 30, with an amplitude within a specified range and a cycle within a specified range, through addition of unburned fuel to the exhaust gas by the fuel addition valve 29. In a second NOx-aftertreatment method, NOx is converted and removed, by using the catalyst device 30 as a NOx storage type catalyst device.

In the following description, two index values, i.e., a base air-fuel ratio AFB and an exhaust air-fuel ratio AFI, are used. The base air-fuel ratio AFB represents the mass ratio of air to fuel in the air-fuel mixtures burned in the cylinders 11. On the other hand, the exhaust air-fuel ratio AFI represents the ratio (the total mass of air supplied/the total mass of fuel supplied) of the total masses of air and fuel supplied to the intake passage 13, cylinders 11, and a portion of the exhaust passage 14 upstream of the catalyst device 30, until the exhaust gas reaches the catalyst device 30. Namely, the exhaust air-fuel ratio AFI represents the ratio of the mass of the air contained before combustion in the cylinders 11, to the total mass of the fuel added in the cylinders 11 through fuel injection by the fuel injection valves 19, and the fuel added in the exhaust passage 14 through fuel addition by the fuel addition valve 29, in the exhaust gas flowing into the catalyst device 30. Accordingly, in a condition where no unburned fuel is added to exhaust gas by the fuel addition valve 29, the value of the base air-fuel ratio AFB coincides with the value of the exhaust air-fuel ratio AFI. The value of the exhaust air-fuel ratio AFI changes according to changes in the HC concentration of exhaust gas flowing into the catalyst device 30.

Figure 3:
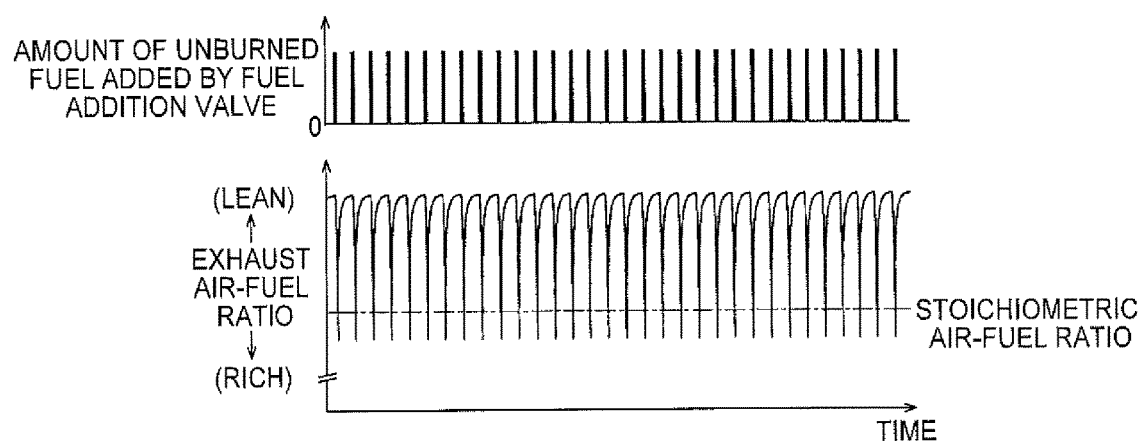
FIG. 3 is a time chart showing a pattern of addition of unburned fuel to exhaust gas by a fuel addition valve during NOx aftertreatment by a first NOx-aftertreatment method, and changes in the exhaust air-fuel ratio caused by the addition.
Figure 4:
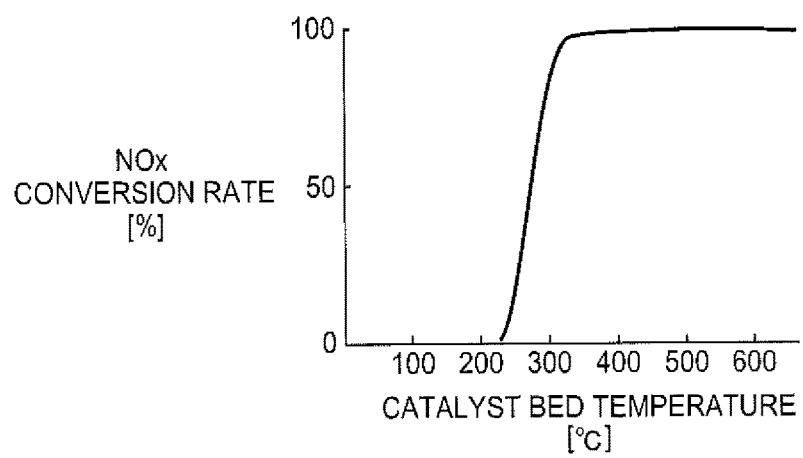
FIG. 4 is a graph indicating the relationship between the NOx conversion rate during NOx aftertreatment by the first NOx-aftertreatment method, and the catalyst temperature.

Initially, the first NOx-aftertreatment method that can be implemented in the catalyst device 30 will be described. FIG. 3 shows a pattern of addition of unburned fuel to exhaust gas by the fuel addition valve 29 when NOx is converted and removed by the first NOx-aftertreatment method, and changes in the exhaust air-fuel ratio AFI caused by the addition. As shown in FIG. 3, at this time, a constant amount of unburned fuel is added at constant intervals by the fuel addition valve 29, so that the exhaust air-fuel ratio AFI, and the HC concentration of exhaust gas flowing into the catalyst device 30, oscillate with a constant amplitude and a constant cycle. It is confirmed that, when the HC concentration of exhaust gas is oscillated with an amplitude within a specified range and a cycle within a specified range, an extremely high NOx conversion rate can be obtained even in a high-temperature region equal to or higher than 400° C., as shown in FIG. 4.

During aftertreatment of NOx by the first NOx-aftertreatment method as described above, a large quantity of reducing intermediates containing nitrogen (N) and hydrocarbon (HC) continue being held or adsorbed on the surface of the basic layer 43, namely, on the exhaust-gas contact surface portion 44 with basicity in the catalyst device 30. It is confirmed that the reducing intermediates largely contribute to NOx aftertreatment.

Figure 5:
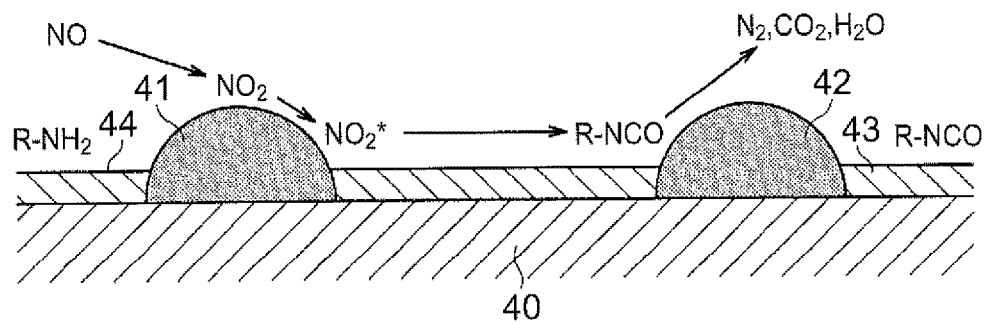
FIG. 5 is a schematic view schematically showing a condition of a surface portion of a catalyst support when the HC concentration of exhaust gas flowing into the catalyst device is low.

FIG. 5 schematically shows a condition of a surface portion of the catalyst support 40 when the HC concentration of exhaust gas flowing into the catalyst device 30 is low. As described above, during aftertreatment of NOx by the first NOx-aftertreatment method, the exhaust air-fuel ratio AFI is lean except for a moment immediately after addition of unburned fuel by the fuel addition valve 29, and exhaust gas flowing into the catalyst device 30 is in an excessive-oxygen state. In the catalyst device 30 at this time, NO contained in the exhaust gas is oxidized on the catalyst particles 41 of platinum and converted into $NO_2$, and the $NO_2$ is supplied with electrons from the catalyst particles 41 of platinum and further converted into $NO_2^-$. A large amount of $NO_2^-$ produced on the catalyst particles 41 in this manner has a strong activity. In the following description, the $NO_2^-$ will be denoted as active $NO_2^*$.

When the oxygen concentration around the active $NO_2^*$ is kept at a high level for a given time or longer after the active $NO_2^*$ is produced, the active $NO_2^*$ is oxidized, and absorbed in the basic layer 43 in the form of nitrate ions $NO_3^-$. However, in this example, unburned fuel is added by the fuel addition valve 29 before the given time elapses, so that the hydrocarbon concentration around the active $NO_2^*$ is increased.

Figure 6:
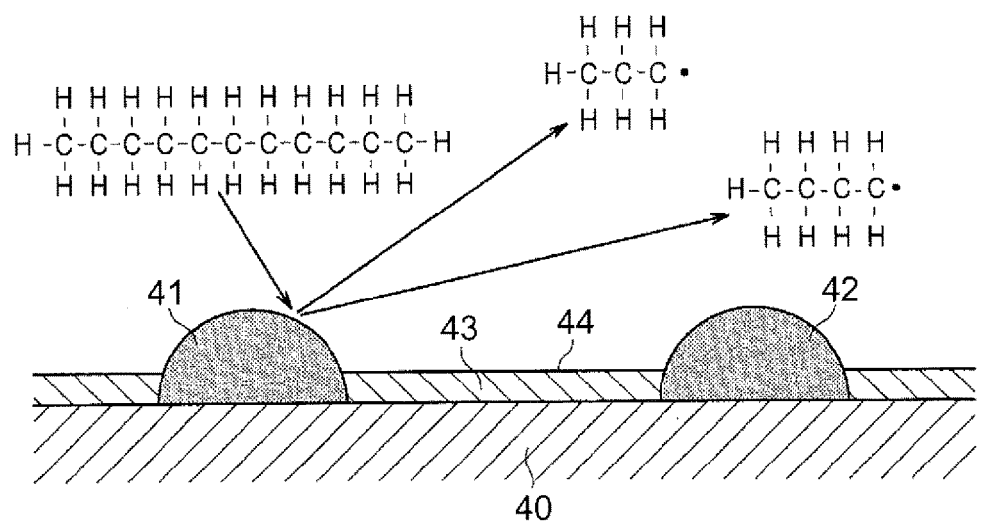
FIG. 6 is a schematic view schematically showing the reforming mechanism of HC in the catalyst device.

When the unburned fuel is added to the exhaust gas by the fuel addition valve 29, hydrocarbon (HC) in the unburned fuel thus added is reformed in the catalyst device 30. FIG. 6 schematically shows the reforming mechanism of HC in the catalyst device 30 at this time. As shown in FIG. 6, HC in the unburned fuel added by the fuel addition valve 29 is converted by the catalyst particles 41, into radical hydrocarbon having a reduced carbon number. As a result, the HC concentration around active $NO_2^*$ is increased.

Figure 7:
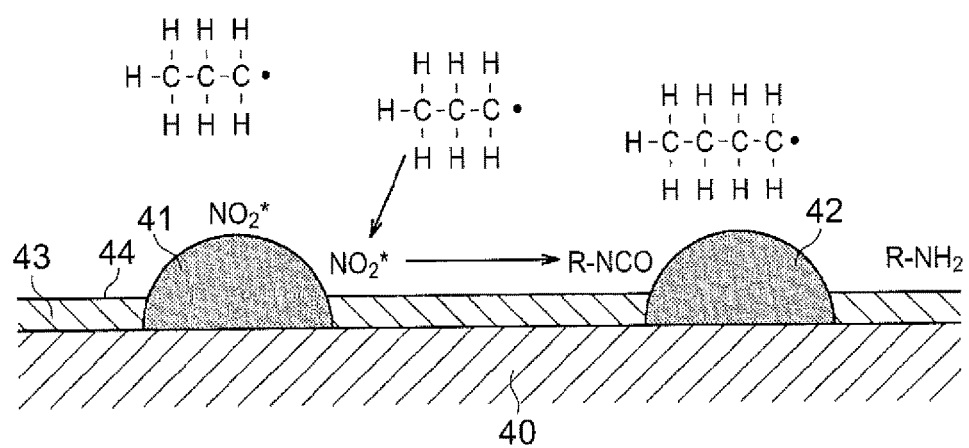
FIG. 7 is a schematic view schematically showing a condition of the surface portion of the catalyst support when the HC concentration of exhaust gas flowing into the catalyst device is high.

FIG. 7 schematically shows a condition of a surface portion of the catalyst support 40 when the HC concentration in the exhaust gas flowing into the catalyst device 30 is high. As shown in FIG. 7, when the HC concentration around active $NO_2^*$ is increased, the active $NO_2^*$ reacts with radical hydrocarbon on the catalyst particles 41 of platinum, so that a reducing intermediate is produced. This reducing intermediate is deposited or adsorbed on the surface of the basic layer 43.

The reducing intermediate initially produced at this time is considered to be a nitro compound $R-NO_2$. When the nitro compound $R-NO_2$ is produced, it turns into a nitrile compound $R-CN$. However, the nitrile compound $R-CN$ can exist only for a moment in this state, and it immediately turns into an isocyanate compound $R-NCO$. When the isocyanate compound $R-NCO$ is hydrolyzed, it turns into an amine compound $R-NH_2$. In this case, however, it is considered that a part of the isocyanate compound $R-NCO$ is hydrolyzed. Accordingly, the most part of reducing intermediates held or adsorbed on the surface of the basic layer 43 is considered to be the isocyanate compound $R-NCO$ and the amine compound $R-NH_2$.

When the reducing intermediates thus produced are surrounded by hydrocarbon, as shown in FIG. 7, reactions of the reducing intermediates are blocked by the hydrocarbon, and do not further proceed. In this condition, when the HC concentration of exhaust gas flowing into the catalyst device 30 is reduced, and the oxygen concentration of the exhaust gas is increased, hydrocarbon around the reducing intermediates is oxidized. As a result, as shown in FIG. 5, the active $NO_2^*$ reacts with the isocyanate compound $R-NCO$ and the amine compound $R-NH_2$ as the reducing intermediates, and turns into $N_2$, $CO_2$, and $H_2O$, so that NOx is converted and removed.

In the first NOx-aftertreatment method as described above, the reducing intermediates produced when the HC concentration of exhaust gas flowing into the catalyst device 30 is increased are caused to react with the active $NO_2^*$ when the HC concentration of the exhaust gas is reduced and the oxygen concentration is increased, so that NOx is converted and removed. Namely, in the first NOx-aftertreatment method, NOx in exhaust gas is converted and removed, by periodically changing the HC concentration of the exhaust gas flowing into the catalyst device 30.

It is necessary to sufficiently increase the HC concentration in exhaust gas, so as to produce the reducing intermediates, and it is necessary to sufficiently reduce the HC concentration in exhaust gas, so as to cause the produced reducing intermediates to react with the active $NO_2^*$. Namely, it is necessary to oscillate the HC concentration in exhaust gas flowing into the catalyst device 30, with an amplitude within a predetermined range. Also, it is necessary to hold a sufficient amount of reducing intermediates ($R-NCO$, $R-NH_2$) on the basic layer 43, until the produced reducing intermediates react with the active $NO_2^*$, so as to assure a high NOx conversion rate. The exhaust-gas contact surface portion 44 with basicity in the catalyst device 30 is provided for holding the reducing intermediates as described above.

On the other hand, when the cycle of addition of the unburned fuel by the fuel addition valve 29 is prolonged, a period in which the oxygen concentration is high, from the time when the HC concentration of exhaust gas flowing into the catalyst device 30 is increased, to the time when the HC concentration is increased next time, is also prolonged. When the period in which the oxygen concentration is high is prolonged beyond a certain extent, the active $NO_2^*$ is absorbed in the form of nitrate in the basic layer 43, without producing any reducing intermediate. To avoid this situation, it is necessary to oscillate the HC concentration of exhaust gas flowing into the catalyst device 30 with a cycle within a predetermined range.

Figure 8:
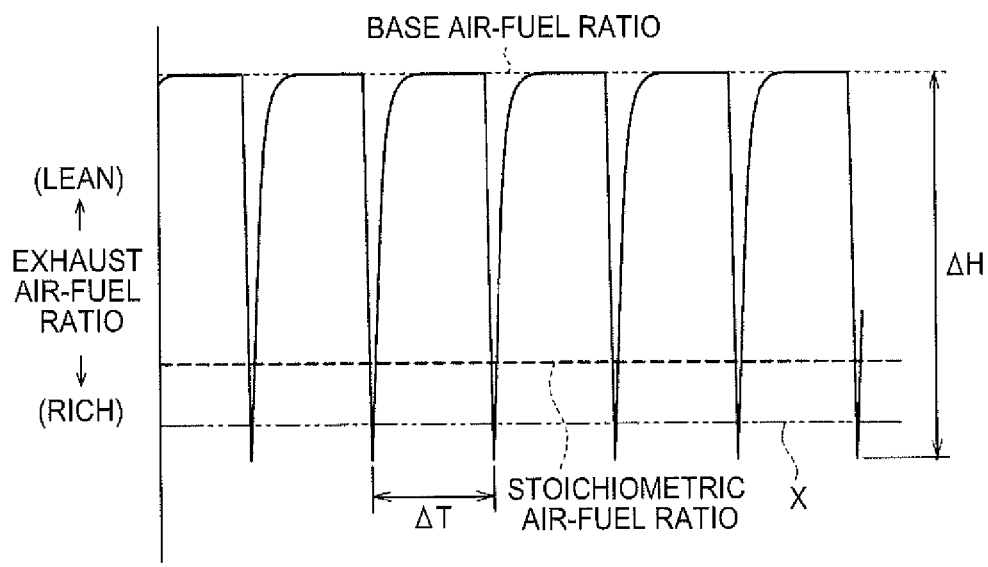
FIG. 8 is a time chart showing one example of a change pattern of the exhaust air-fuel ratio during NOx aftertreatment by the first NOx-aftertreatment method.

FIG. 8 shows one example of a change pattern of the exhaust air-fuel ratio AFI during aftertreatment of NOx by the first NOx-aftertreatment method. In FIG. 8, "ΔH" indicates the oscillation amplitude of the exhaust air-fuel ratio AFI, and "ΔT" indicates the oscillation cycle of the exhaust air-fuel ratio AFI. As described above, the value of the exhaust air-fuel ratio AFI changes according to changes in the HC concentration in the exhaust gas flowing into the catalyst device 30. Accordingly, the oscillation amplitude ΔH of the exhaust air-fuel ratio AFI corresponds to the oscillation amplitude of the HC concentration in the exhaust gas flowing into the catalyst device 30, and the oscillation cycle ΔT of the exhaust air-fuel ratio AFI corresponds to the oscillation cycle of the HC concentration in the exhaust gas flowing into the catalyst device 30.

As described above, the reducing intermediates are produced when the HC concentration is increased. However, when the oxygen concentration around the active $NO_2^*$ at this time is higher than a certain level, hydrocarbon is completely oxidized before reacting with the active $NO_2^*$, and the reducing intermediates will not be produced. Therefore, it is necessary to make the exhaust air-fuel ratio AFI lower than a given value, for production of the reducing intermediates. In FIG. 8, "X" represents the upper-limit value of the exhaust air-fuel ratio AFI required to produce the reducing intermediates. In the following description, the "X" will be referred to as "required minimum air-fuel ratio".

Figure 9:
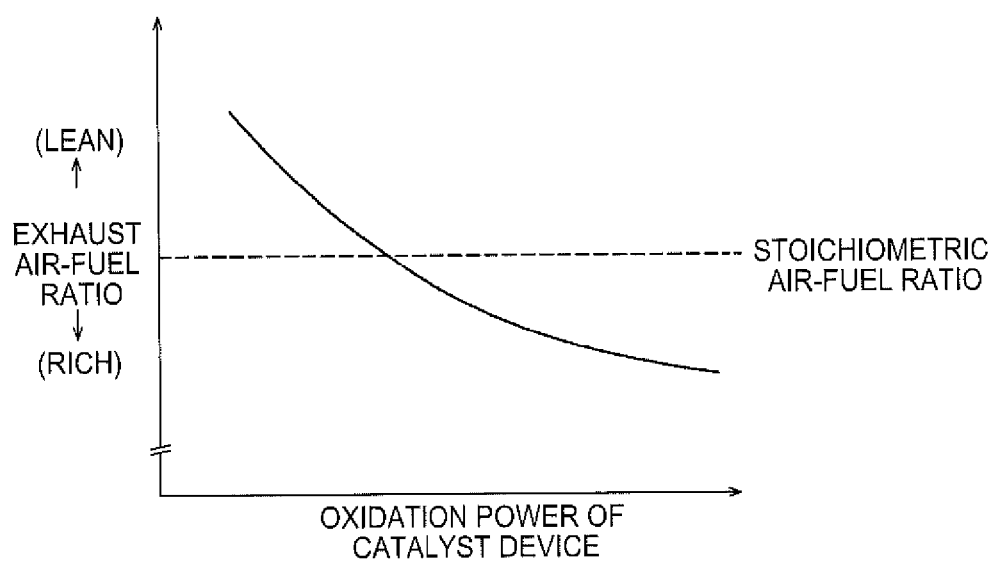
FIG. 9 is a graph indicating the relationship between the oxidation power of the catalyst device and the required minimum air-fuel ratio.

As shown in FIG. 9, the value of the required minimum air-fuel ratio X changes depending on the oxidation power of the catalyst device 30, and becomes a richer value as the oxidation power of the catalyst device 30 is stronger. Therefore, the value of the required minimum air-fuel ratio X may be a richer value than the stoichiometric air-fuel ratio, or may be a leaner value than the stoichiometric air-fuel ratio. In the example of FIG. 8, the required minimum air-fuel ratio X is a richer value than the stoichiometric air-fuel ratio. In this case, it is necessary to oscillate the HC concentration in the exhaust gas flowing into the catalyst device 30, so that the exhaust air-fuel ratio AFI momentarily becomes richer than the stoichiometric air-fuel ratio, so as to produce the reducing intermediates.

Figure 10:
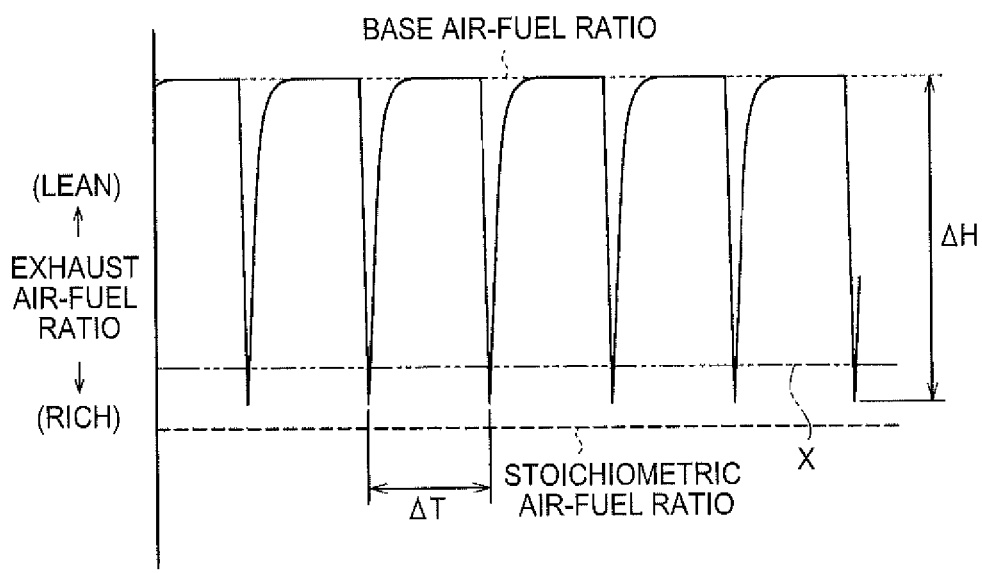
FIG. 10 is a time chart showing one example of a change pattern of the exhaust air-fuel ratio during NOx aftertreatment by the first NOx-aftertreatment method, in the case where the required minimum air-fuel ratio is leaner than the stoichiometric air-fuel ratio.

FIG. 10 shows one example of a change pattern of the exhaust air-fuel ratio AFI during aftertreatment of NOx by the first NOx-aftertreatment method, when the required minimum air-fuel ratio X is a leaner value than the stoichiometric air-fuel ratio. In this case, the reducing intermediates can be produced by oscillating the HC concentration in the exhaust gas flowing into the catalyst device 30 within a range in which the exhaust air-fuel ratio AFI is kept being leaner than the stoichiometric air-fuel ratio.

In this connection, when the oscillation amplitude of the HC concentration is excessively large, the HC becomes redundant, and is discharged as it is from the catalyst device 30 without being oxidized, resulting in unwanted deterioration of the fuel consumption. Accordingly, it is desirable to make the oscillation amplitude of the HC concentration as small as possible, within a range in which the exhaust air-fuel ratio AFI momentarily becomes lower than the required minimum air-fuel ratio X.

When the base air-fuel ratio AFB becomes higher, it is necessary to oscillate the exhaust air-fuel ratio AFI with a larger amplitude, so as to momentarily make the exhaust air-fuel ratio AFI smaller than the required minimum air-fuel ratio X. Namely, as the base air-fuel ratio AFB is higher, it is necessary to increase the oscillation amplitude of the HC concentration in the exhaust gas flowing into the catalyst device 30.

Figure 11:
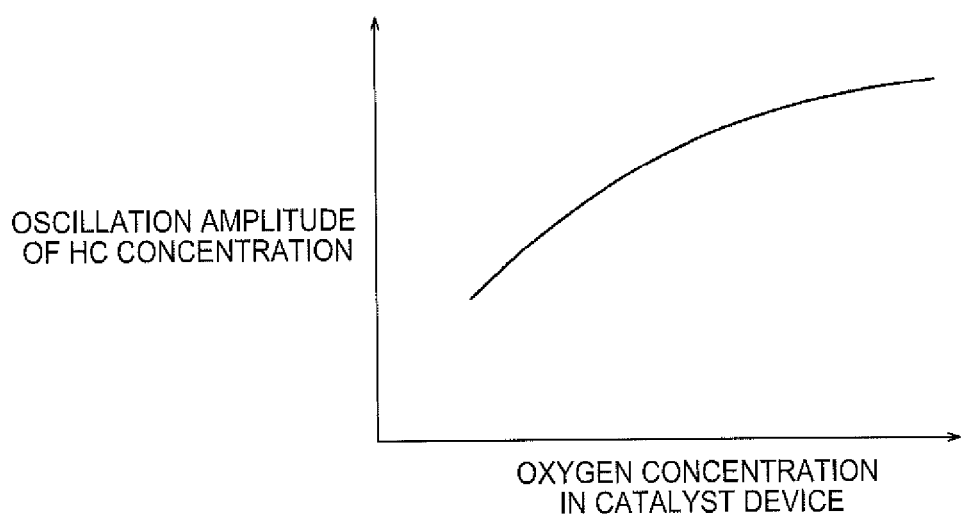
FIG. 11 is a graph indicating the relationship between the oxygen concentration of exhaust gas before unburned fuel is added by the fuel addition valve, and the oscillation amplitude of the HC concentration with which the specified NOx conversion rate is obtained.

FIG. 11 shows the relationship between the oxygen concentration in exhaust gas before addition of unburned fuel by the fuel addition valve 29, and the oscillation amplitude of the HC concentration with which a specified NOx conversion rate is obtained. As shown in FIG. 11, in order to obtain the specified NOx conversion rate, it is necessary to increase the oscillation amplitude of the HC concentration as the oxygen concentration in exhaust gas before addition of unburned fuel is higher. In other words, when the base air-fuel ratio AFB is low, the oscillation amplitude of the HC concentration may be reduced. In this connection, as the oscillation amplitude of the HC concentration is larger, the amount of the unburned fuel added by the fuel addition valve 29 needs to be increased, and the fuel consumption is increased. Therefore, it is desirable to adjust the oscillation amplitude of the HC concentration according to the base air-fuel ratio AFB, within a range in which the reducing intermediates can be produced.

Figure 12:
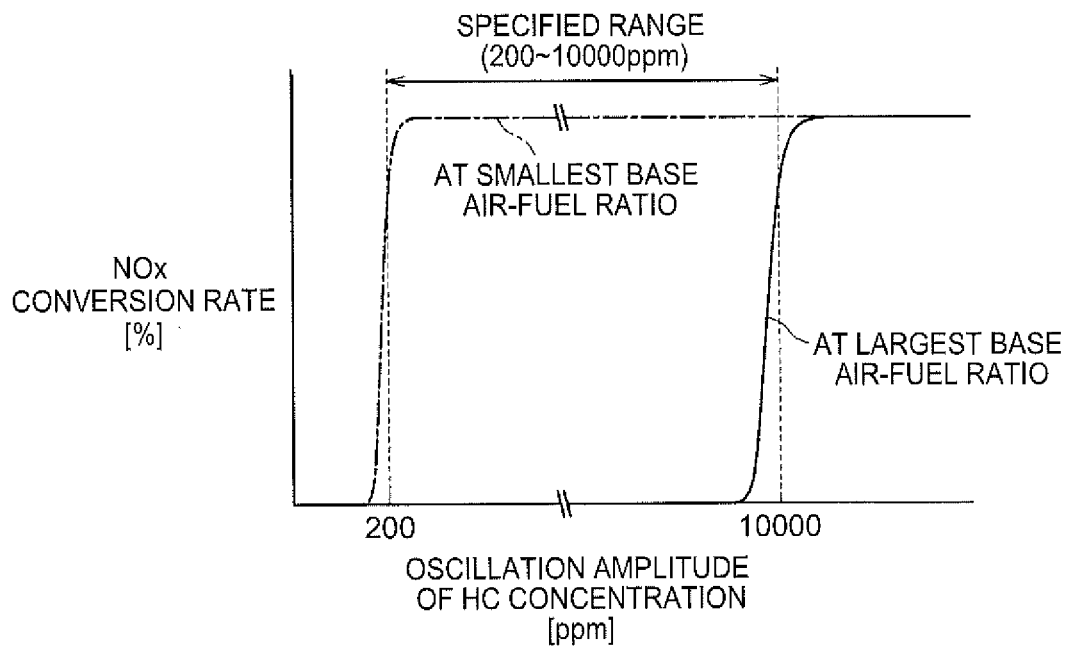
FIG. 12 is a graph indicating the relationship between the oscillation amplitude of the HC concentration at the time when the base air-fuel ratio is the smallest ratio, and the time when the base air-fuel ratio is the largest ratio, and the NOx conversion rate of the catalyst device.

FIG. 12 shows the relationship between the oscillation amplitude of the HC concentration and the NOx conversion rate of the catalyst device 30, when the base air-fuel ratio AFB is the lowest (at the time of the minimum base air-fuel ratio), and when the base air-fuel ratio AFB is the highest (at the time of the maximum base air-fuel ratio), in the diesel engine in which the emission control system of this embodiment is used. The base air-fuel ratio AFB is minimized when the diesel engine is accelerated. At this time, when the oscillation amplitude of the HC concentration is made larger than 200 ppm, NOx can be favorably converted and removed. On the other hand, when the base air-fuel ratio AFB is maximized, it is necessary to make the oscillation amplitude of the HC concentration around 10000 ppm, so as to obtain a high NOx conversion rate. However, when the oscillation amplitude of the HC concentration exceeds 10000 ppm, the exhaust air-fuel ratio AFI becomes excessively rich, and NOx cannot be appropriately converted and removed by the first NOx-aftertreatment method. Therefore, in the emission control system of this embodiment, during NOx aftertreatment by the first NOx-aftertreatment method, the HC concentration of the exhaust gas flowing into the catalyst device 30 is oscillated with an amplitude within the range of 200 ppm to 10000 ppm.

Figure 13:
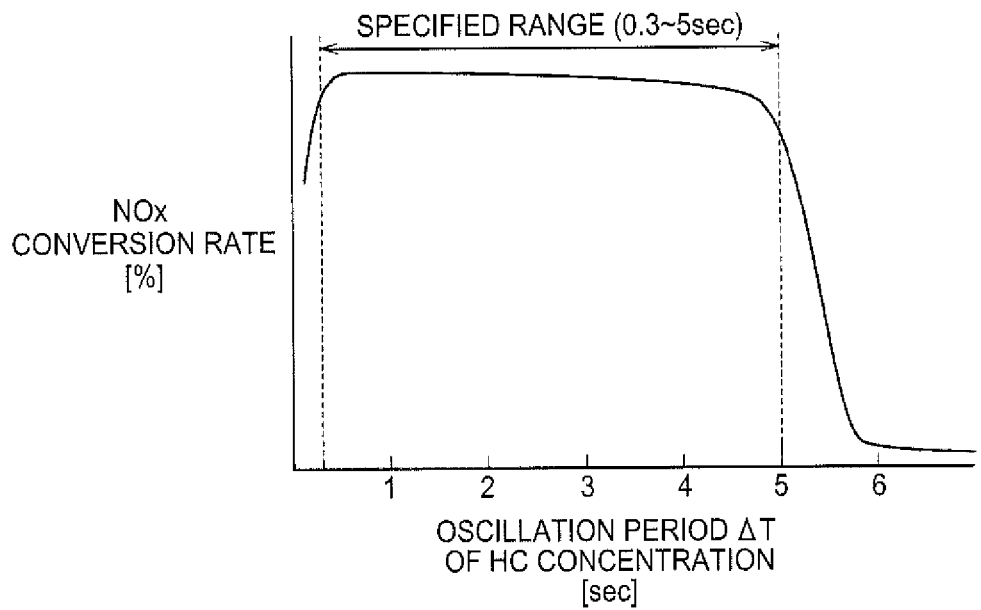
FIG. 13 is a graph indicating the relationship between the oscillation cycle of the HC concentration of exhaust gas flowing into the catalyst device, and the NOx conversion rate of the catalyst device.

FIG. 13 shows the relationship between the oscillation cycle of the HC concentration of the exhaust gas flowing into the catalyst device 30, and the NOx conversion rate of the catalyst device 30. When the oscillation cycle of the HC concentration is prolonged, the oxygen concentration around the active $NO_2^*$ becomes high, during a period between the time when the unburned fuel is added by the fuel addition valve 29, and the time when the addition is performed next time. In this case, when the oscillation cycle of the HC concentration becomes longer than about 5 seconds, the active $NO_2^*$ starts being absorbed in the form of nitrate in the basic layer 43. Accordingly, when the oscillation cycle of the HC concentration becomes longer than about 5 seconds, the NOx conversion rate is reduced. On the other hand, when the oscillation cycle of the HC concentration becomes equal to or shorter than about 0.3 seconds, HC in the exhaust gas flowing into the catalyst device 30 starts being deposited on the exhaust-gas contact surface portion 44 of the catalyst device 30. Accordingly, when the oscillation cycle of the HC concentration is equal to or shorter than 0.3 seconds, too, the NOx conversion rate is reduced. Therefore, in the emission control system of this embodiment, during NOx aftertreatment by the first NOx-aftertreatment method, the HC concentration of the exhaust gas flowing into the catalyst device 30 is oscillated with a cycle within the range of 0.3 sec. to 5 sec.

Figure 14:
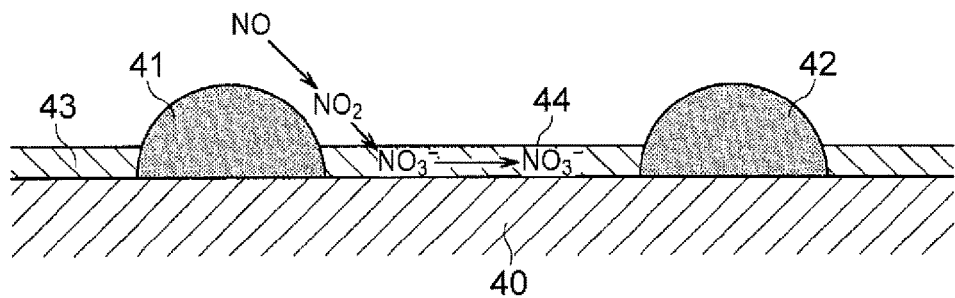
FIG. 14 is a schematic view schematically showing a condition of the surface portion of the catalyst support when the oscillation cycle of the HC concentration of exhaust gas flowing into the catalyst device is made longer than the specified range.

Subsequently, a second NOx-aftertreatment method that can be implemented in the catalyst device 30 will be described. FIG. 14 schematically shows a condition of a surface portion of the catalyst support 40 when the oscillation cycle of the HC concentration of the exhaust gas flowing into the catalyst device 30, namely, the cycle of addition of the unburned fuel to the exhaust gas by the fuel addition valve 29, is made longer than the above-described specified range (the range of 0.3 sec. to 5 sec.). As shown in FIG. 14, in this case, R—NCO and R—$NH_2$ as reducing intermediates disappear from the surface of the basic layer 43 of the catalyst device 30. On the other hand, the active $NO_2^*$ produced on the catalyst particles 41 at this time diffuses, in the form of nitrate ions $NO_3^-$, into the basic layer 43, and turns into nitrate. Namely, NOx in the exhaust gas at this time is absorbed in the form of nitrate in the basic layer 43.

Figure 15:
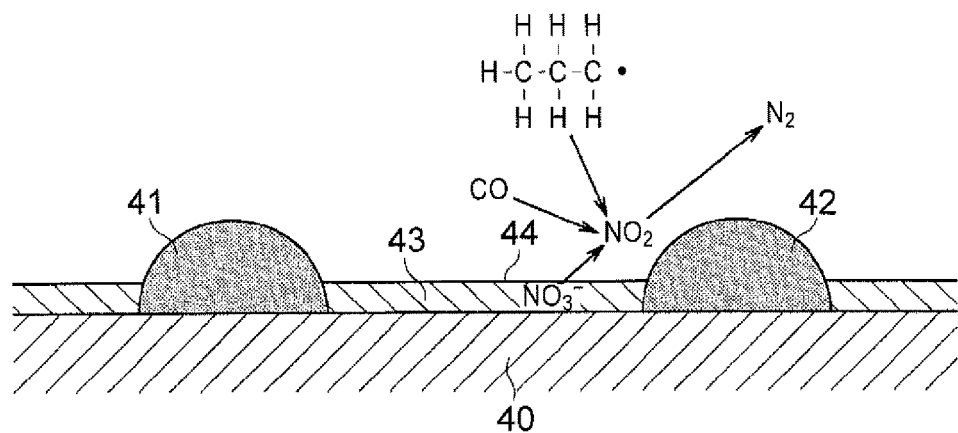
FIG. 15 is a schematic view schematically showing a condition of the surface portion of the catalyst support when the exhaust air-fuel ratio is made rich in a condition where NOx is absorbed, in the form of nitrate, in a basic layer.

FIG. 15 schematically shows a condition of a surface portion of the catalyst support 40 when the exhaust air-fuel ratio AFI is made equal to or richer than the stoichiometric air-fuel ratio, in a condition where NOx is absorbed in the form of nitrate in the basic layer 43. At this time, since the oxygen concentration in the exhaust gas is reduced, reactions proceed in a direction opposite to that of the case of FIG. 14, and the nitrate absorbed in the basic layer 43 successively turns into nitrate ions $NO_3^-$, and further turns into $NO_2$, which is released to the exhaust gas. Then, the released $NO_2$ is reduced by HC and CO in the exhaust gas.

Thus, in the catalyst device 30, NOx can also be converted and removed by keeping the exhaust air-fuel ratio AFI at a value that is leaner than the stoichiometric air-fuel ratio for a given time or longer, so as to store NOx in exhaust gas, and then temporarily making the exhaust air-fuel ratio AFI richer than the stoichiometric air-fuel ratio, so as to reduce the stored NOx. Here, the method of NOx aftertreatment by repeating absorption of NOx and release and reduction of the absorbed NOx is called second NOx-aftertreatment method.

In some cases, the basic layer 43 may temporarily adsorb NOx at this time. Here, "storage" is used as a term that encompasses both absorption and adsorption. In the second NOx-aftertreatment method, the basic layer 43 of the catalyst device 30 is used as a NOx storage agent that temporarily stores NOx. The catalyst device 30 at this time functions as a NOx storage type catalyst device that stores NOx when the exhaust air-fuel ratio AFI is leaner than the stoichiometric air-fuel ratio, and releases the stored NOx when the oxygen concentration of exhaust gas is reduced.

Figure 16:
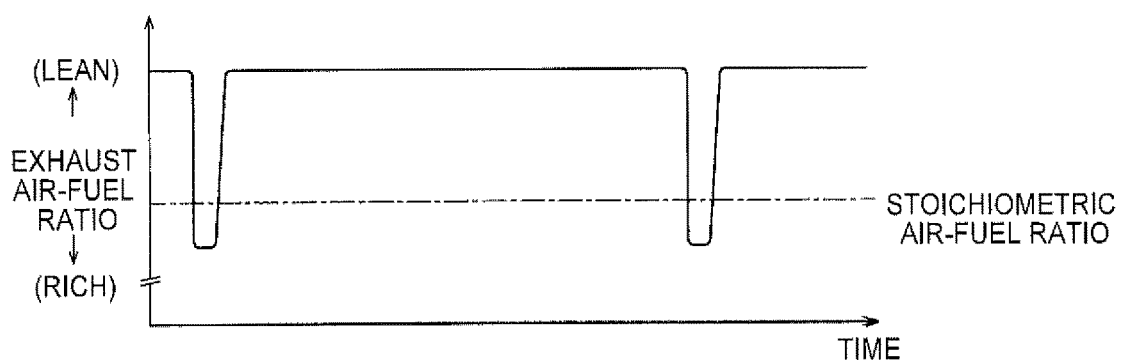
FIG. 16 is a time chart showing one example of a change pattern of the exhaust air-fuel ratio when NOx is converted and removed by a second NOx-aftertreatment method.

FIG. 16 shows one example of a change pattern of the exhaust air-fuel ratio AFI when NOx is converted and removed by the second NOx-aftertreatment method. Here, NOx is absorbed in the basic layer 43 of the catalyst device 30, in a condition where the exhaust air-fuel ratio AFI is kept at a value that is leaner than the stoichiometric air-fuel ratio, and the exhaust air-fuel ratio AFI is temporarily made equal to a value that is richer than the stoichiometric air-fuel ratio shortly before the NOx storage capability of the basic layer 43 is saturated. The exhaust air-fuel ratio AFI is made rich at this time, by increasing the amount of fuel injected by the fuel injection valves 19. In the example of FIG. 16, the time interval between the times at which the exhaust air-fuel ratio AFI is made rich is set to one minute or longer.

Figure 17:
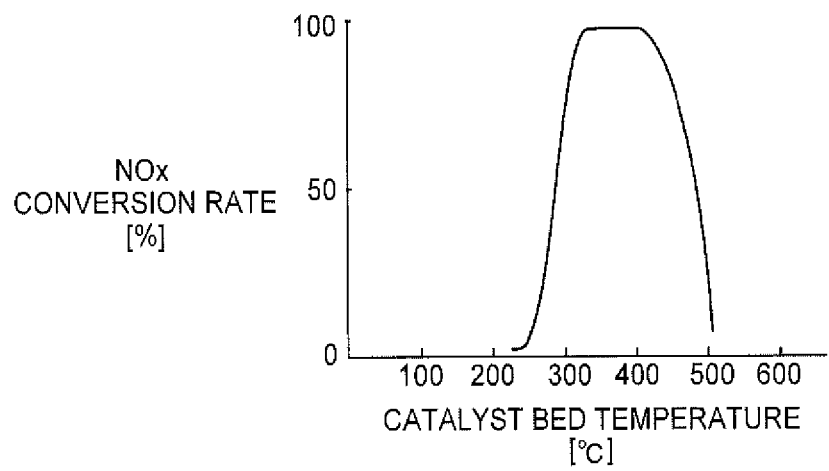
FIG. 17 is a graph indicating the relationship between the catalyst temperature and the NOx conversion rate of the catalyst device when NOx is converted and removed by the second NOx-aftertreatment method.

FIG. 17 shows the relationship between the catalyst temperature TC at the time when NOx is converted and removed by the second NOx-aftertreatment method, and the NOx conversion rate of the catalyst device 30. As shown in FIG. 17, in the second NOx-aftertreatment method, an extremely high NOx conversion rate can be obtained when the catalyst temperature TC is between 300° C. and 400° C. On the other hand, when the catalyst temperature TC enters a high-temperature region of 400° C. or higher, the NOx conversion rate is reduced. This is because, when the catalyst temperature TC rises to be equal to or higher than 400° C., nitrate is thermally decomposed, and is released in the form of $NO_2$ from the catalyst device 30. Namely, since NOx is stored in the form of nitrate, it is difficult to achieve a high NOx conversion rate by the second NOx-aftertreatment method, in a high-temperature region in which the catalyst temperature TC exceeds 400° C. On the other hand, in the first NOx-aftertreatment method as described above, substantially no nitrate is produced, or a minute amount of nitrate is produced even if it is produced, and has no influence on the process of converting and removing NOx. Therefore, as shown in FIG. 4 above, in the first NOx-aftertreatment method, a high NOx conversion rate can be obtained, even in the high-temperature region in which the catalyst temperature TC exceeds 400° C.

Thus, in the emission control system of this embodiment, during operation of the diesel engine, NOx in exhaust gas is converted and removed by the first NOx-aftertreatment method. More specifically, the electronic control unit 37 causes the fuel addition valve 29 to periodically add unburned fuel to exhaust gas, during operation of the diesel engine. The addition of the unburned fuel by the fuel addition valve 29 at this time is controlled such that the oscillation amplitude and oscillation cycle of the HC concentration in the exhaust gas flowing into the catalyst device 30 become the optimum amplitude and cycle for NOx aftertreatment by the first NOx-aftertreatment method.

Next, regeneration control will be described. In some cases, sulfur oxides (SOx) in exhaust gas are stored in the form of sulfate in the basic layer 43 of the catalyst device 30. The storage of SOx in the basic layer 43 starts from an upstream-side end portion of the catalyst device 30. Then, the basicity of the basic layer 43 is weakened, in a portion where the storage amount of SOx is increased. Therefore, as the storage of SOx proceeds, the oxidation power of the catalyst particles 41 increases as the basicity of the basic layer 43 around the particles 41 weakens, in the upstream-side end portion of the catalyst device 30. At the same time, the location where reduction of NOx is mainly performed in the catalyst device 30 shifts to the downstream side. In the catalyst device 30 of this case, since a large amount of hydrocarbon is oxidized in the upstream-side end portion in which the oxidation power of the catalyst particles 41 is increased, the amount of hydrocarbon that reaches the location where reduction of NOx is mainly performed is reduced. As a result, the reduction of the NOx reducing power of the catalyst device 30 gives rise to so-called sulfur poisoning of the catalyst device 30.

Thus, when the sulfur storage amount of the catalyst device 30 increases, the electronic control unit 37 performs regeneration control for releasing the stored sulfur. The regeneration control is performed by alternately and repeatedly performing a temperature raising operation to raise the temperature of the catalyst device 30 to a temperature required to release sulfur stored in the catalyst device 30, and a releasing operation to control the air-fuel ratio (base air-fuel ratio AFB) of air-fuel mixtures burned in the cylinders 11 to a value required to release sulfur stored in the catalyst device 30. The electronic control unit 37 estimates the sulfur storage amount of the catalyst device 30, and starts regeneration control when the estimated sulfur storage amount is equal to or larger than a specified start determination value.

In the temperature raising operation under the regeneration control, the temperature of the catalyst device 30 can be raised by increasing the amount of flow of hydrocarbon into the catalyst device 30 (HC inflow amount), and increasing the quantity of heat generated by oxidation reaction of hydrocarbon. Meanwhile, in this emission control system, the HC inflow amount of the catalyst device 30 can be increased by the following two methods. Specifically, the two methods are a first temperature raising method by which the HC inflow amount of the catalyst device 30 is increased through execution of post injection by the fuel injection valves 19, and a second temperature raising method by which the HC inflow amount of the catalyst device 30 is increased through execution of unburned fuel addition by the fuel addition valve 29.

Figure 18:
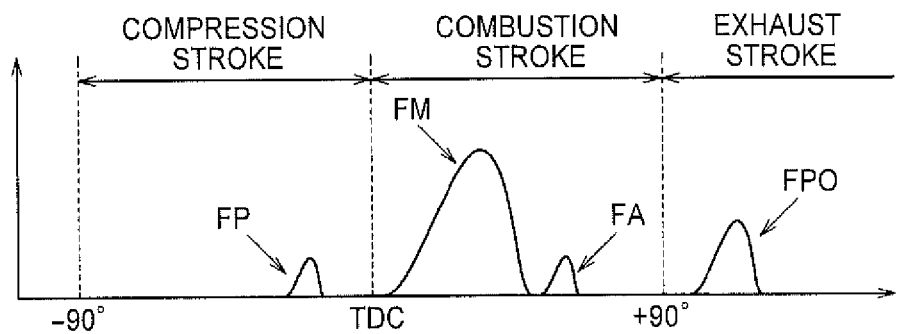
FIG. 18 is a time chart indicating one example of a pattern in which fuel is injected by a fuel injection valve when a temperature raising operation is performed by a first temperature raising method.

FIG. 18 shows one example of pattern in which the fuel is injected by the fuel injection valves 19 when the temperature raising operation is performed by the first temperature raising method. In the example shown in FIG. 18, the fuel injection for supplying fuel to be burned in each cylinder 11 is divided into three injection events. Specifically, they are pilot injection FP executed in the later period of the compression stroke, main injection FM executed immediately after the engine enters the combustion stroke, and after injection FA executed after the main injection FM is performed on the combustion stroke. Further, post injection FPO as fuel injection during the exhaust stroke performed so as to increase the HC inflow amount of the catalyst device 30 is carried out, separately from these fuel injections for supplying the fuel to be burned in the cylinder 11. The fuel injected by post injection during the exhaust stroke is not burned in the cylinder 11, but flows into the catalyst device 30 along with exhaust gas. Therefore, by conducting the post injection, it is possible to increase the HC inflow amount of the catalyst device 30, and raise the catalyst temperature TC.

Figure 19:
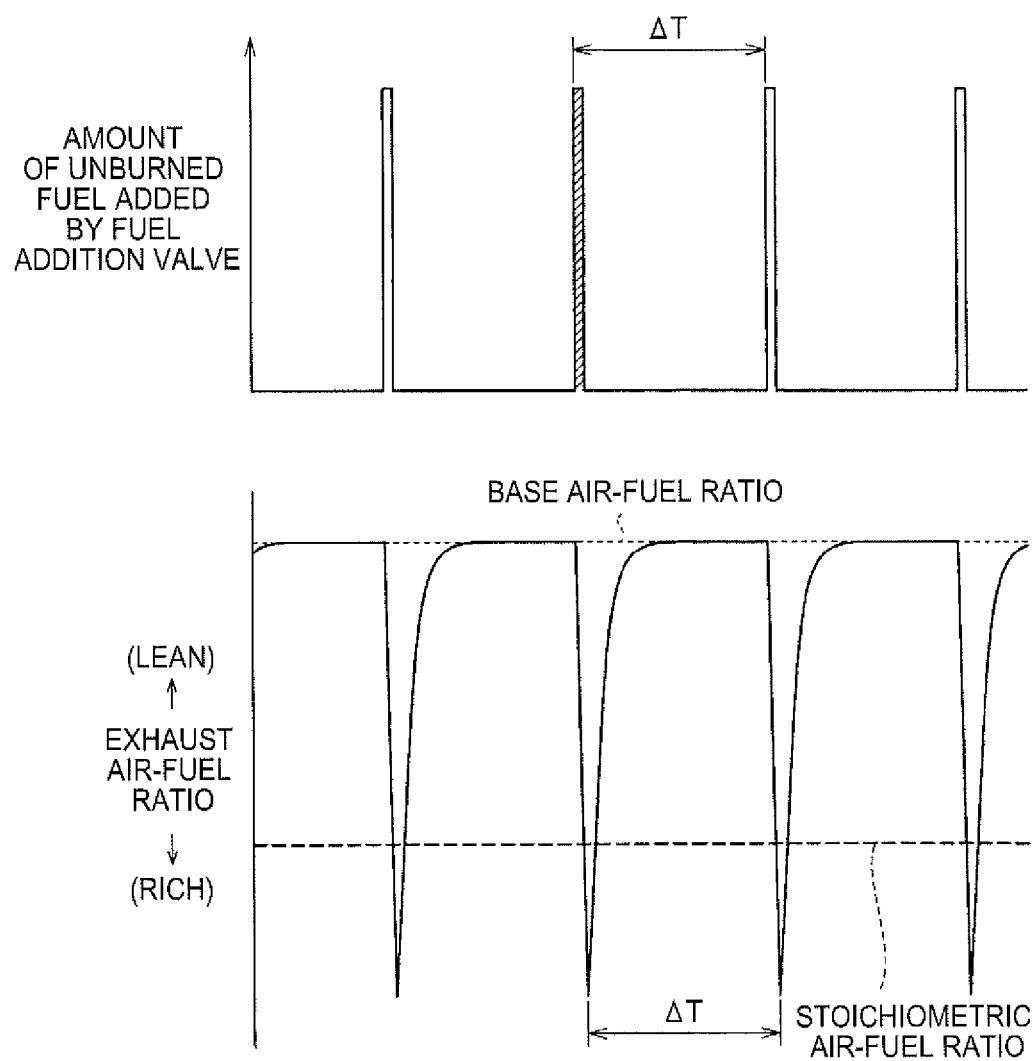
FIG. 19 is a time chart indicating an addition pattern of the fuel addition valve during NOx aftertreatment by the first NOx-aftertreatment method, and changes in the exhaust air-fuel ratio according to the pattern.

FIG. 19 shows a pattern in which unburned fuel is added by the fuel addition valve 29 so as to convert and remove NOx by the first NOx-aftertreatment method as described above, and changes in the exhaust air-fuel ratio AFI according to the addition pattern. At this time, unburned fuel is added by the fuel addition valve 29, such that the HC concentration of the exhaust gas flowing into the catalyst device 30 is oscillated with an amplitude within the above-described specified range (200 ppm-10000 ppm), and a cycle within the specified range (0.3 sec.-5 sec.), so as to produce reducing intermediates in the catalyst device 30, and obtain a high NOx conversion rate.

Immediately after the addition of the unburned fuel by the fuel addition valve 29 at this time, the HC inflow amount of the catalyst device 30 is increased, and the catalyst temperature TC is temporarily increased due to heat generated by oxidation reaction of hydrocarbon. However, the catalyst temperature TC increased at this time is reduced down to the temperature of exhaust gas, because of cooling by exhaust gas having a relatively low temperature, during a period until the HC inflow amount is increased again through the next addition of unburned fuel. Therefore, the catalyst temperature TC at this time is kept at a temperature close to the temperature of exhaust gas. Namely, the cycle of addition of unburned fuel at this time, i.e., the oscillation cycle of the HC concentration, is set to a relatively long time (e.g., about 3 seconds) within the above-indicated specified range, so that the catalyst temperature TC does not gradually increase.

Figure 20:
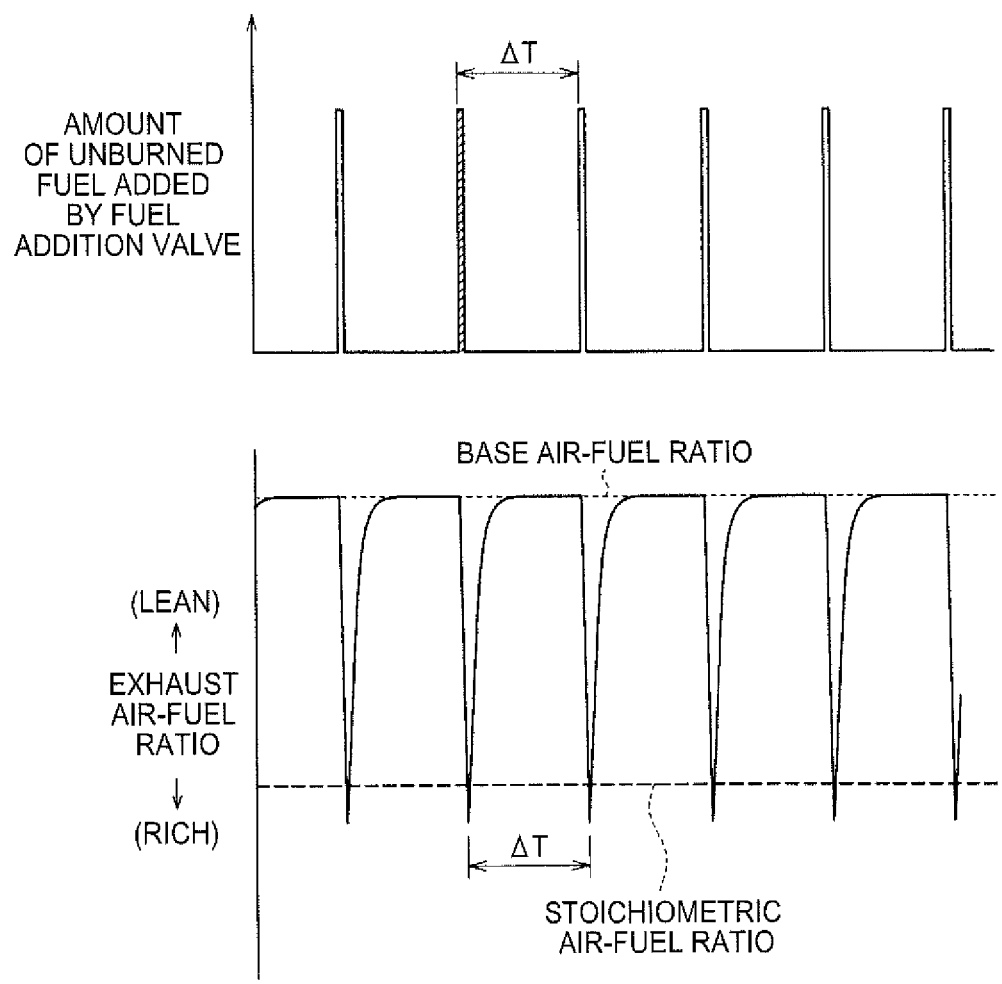
FIG. 20 is a time chart indicating an addition pattern of the fuel addition valve during the temperature raising operation by the second temperature raising method, and changes in the exhaust air-fuel ratio according to the pattern.

FIG. 20 shows a pattern in which unburned fuel is added by the fuel addition valve 29 when the temperature raising operation is performed by the second temperature raising method, and changes in the exhaust air-fuel ratio AFI according to the addition pattern. As shown in FIG. 20, the cycle of addition of unburned fuel by the fuel addition valve 29 at this time is made shorter than that in the case of FIG. 19. At this time, the next addition of unburned fuel is carried out, before the catalyst temperature TC that has increased due to increase of the HC inflow amount according to addition of unburned fuel is reduced down to the temperature of exhaust gas. Therefore, the catalyst temperature TC is gradually increased. Although the cycle of addition of unburned fuel by the fuel addition valve 29 at this time is shorter than that in the case of FIG. 19, the cycle is still set to be within the above-described specified range. Also, the amount of unburned fuel added by the fuel addition valve 29 at this time is set such that the HC concentration of the exhaust gas flowing into the catalyst device 30 oscillates with an amplitude within the above-described specified range. Therefore, at this time, too, production of reducing intermediates within the catalyst device 30 is continued. The amount of unburned fuel added in each addition is made smaller than that in the case of FIG. 19, so as to suppress increase of the total amount of unburned fuel added per unit time.

In the meantime, when the exhaust air-fuel ratio AFI is reduced to the stoichiometric air-fuel ratio, or a value that is richer than the stoichiometric air-fuel ratio, in a condition where the catalyst temperature TC is increased to be higher than a temperature required for release of sulfur through the temperature raising operation, sulfur stored in the form of sulfate in the basic layer 43 of the catalyst device 30 is released to the exhaust gas, through a reaction opposite to that at the time of storage. However, when the exhaust air-fuel ratio AFI is kept in a rich state for a long time, the amount of unburned fuel components (e.g., HC, CO) released to the ambient air is increased. Therefore, in this embodiment, the releasing operation is performed by periodically carrying out rich spikes for a specified period, by temporarily increasing the fuel injection amount by the fuel injection valves 19, so as to temporarily reduce the base air-fuel ratio AFB to be lower than the stoichiometric air-fuel ratio.

As described above, this emission control system can perform poisoning recovery control through two ways of control, namely, control in a first control mode in which the temperature raising operation and the releasing operation are alternately repeated while the temperature raising operation is performed by the first temperature raising method, and control in a second control mode in which the temperature raising operation and the releasing operation are alternately repeated while the temperature raising operation is performed by the second temperature raising method. However, there is a problem as follows, in each of the control modes.

As described above, it becomes impossible to convert and remove NOx by the second NOx-aftertreatment method when the catalyst temperature TC enters a high-temperature region that is equal to or higher than 400° C. Also, during control in the first control mode, the HC concentration of exhaust gas is increased each time the post injection is carried out in each cylinder 11 of the diesel engine, and the HC concentration of exhaust gas flowing into the catalyst device 30 oscillates accordingly. The cycle of oscillation of the HC concentration at this time is shorter than the cycle within the specified range, with which the above-described reducing intermediates can be produced. Therefore, when regeneration control is performed in the first control mode, it becomes impossible to convert and remove NOx by means of the catalyst device 30 in the middle of the temperature raising operation.

On the other hand, during control in the second control mode, NOx aftertreatment by the second NOx-aftertreatment method can be continued even during the temperature raising operation. In this case, however, it is necessary to set the oscillation cycle of the HC concentration of the exhaust gas flowing into the catalyst device 30 within the above-described specified range, so as to produce the reducing intermediates. The oscillation cycle of the HC concentration at this time is longer than the oscillation cycle in the case where the temperature raising operation is performed by the first temperature raising method. Namely, the time interval from the time when the catalyst temperature TC is increased due to heat generated by oxidation reaction of hydrocarbon according to increase of the HC inflow amount of the catalyst device 30, to the time when the HC inflow amount is increased next time, is prolonged. In this case, even if the catalyst temperature TC increases according to increase of the HC inflow amount, an upstream-side end portion of the catalyst support 40 on which exhaust gas blows directly is cooled by the flow of the exhaust gas having a relatively low temperature, during a period until the HC inflow amount is increased next time, and the increased catalyst temperature TC is reduced. Therefore, during control in the second control mode, the catalyst temperature TC of the upstream-side end portion of the catalyst support 40 cannot be increased to a temperature at which sulfur can be released, in the temperature raising operation, and the sulfur storage amount of the upstream-side end portion of the catalyst support 40 may not be sufficiently reduced. Namely, in the second control mode, after the regeneration control is carried out, the sulfur storage amount of the catalyst device 30 may not be reduced to such an extent as that in the case of the first control mode.

Figure 21:
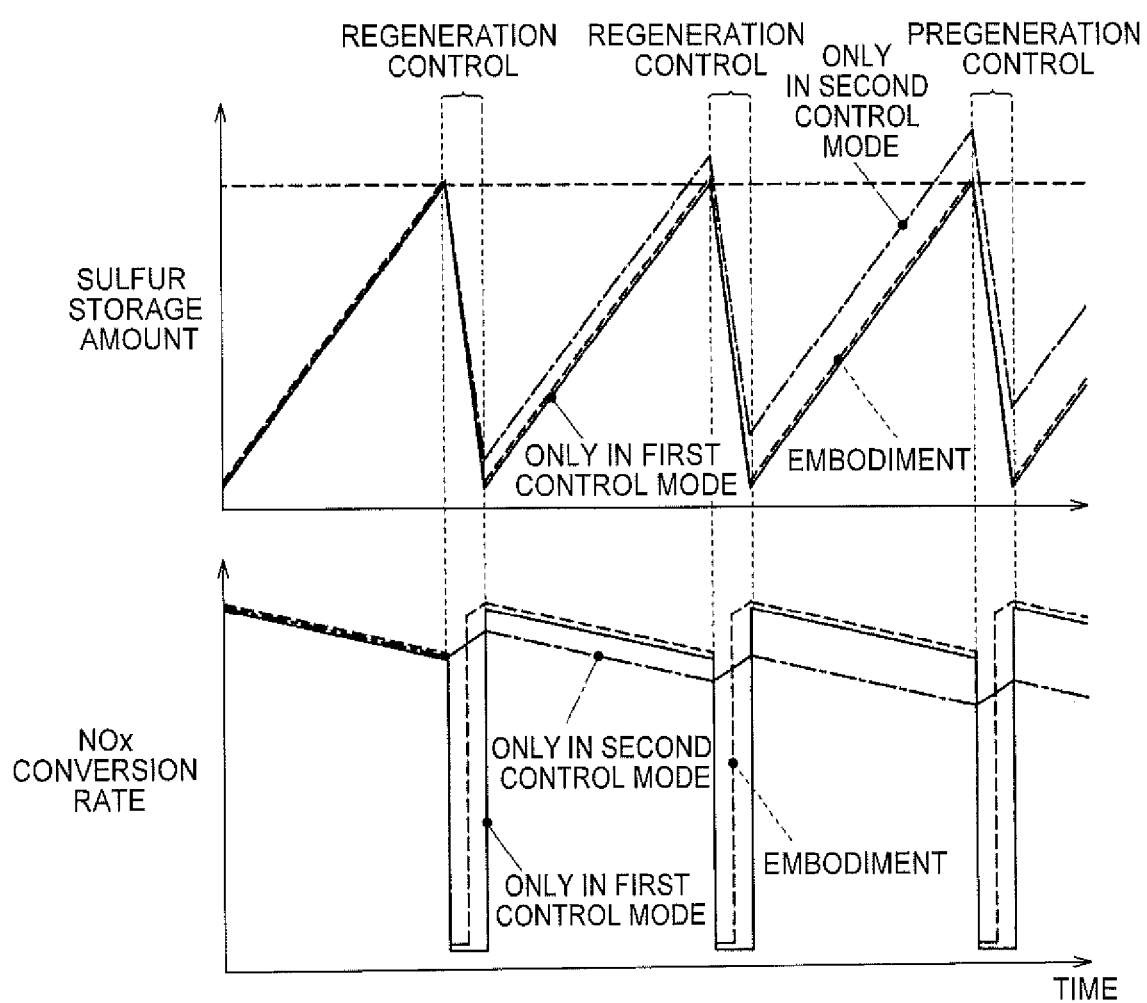
FIG. 21 is a time chart indicating changes in the sulfur storage amount of the catalyst device and the NOx conversion rate with time, in each of the case where regeneration control is performed only in a first control mode, the case where regeneration control is performed only in a second control mode, and the case of this embodiment.

FIG. 21 shows changes in the NOx conversion rate of the catalyst device 30 and the sulfur storage amount with time, in each of the case where the diesel engine is operated while the regeneration control is performed only in the first control mode, and the case where the diesel engine is operated while the regeneration control is performed only in the second control mode. In the example shown in FIG. 21, the sulfur storage amount is estimated on the assumption that, in the case where the regeneration control is performed only in the second control mode, too, the sulfur storage amount of the catalyst device 30 is reduced by the same degree as that in the case where the regeneration control is performed only in the first control mode, and the regeneration control is carried out based on the result of estimation.

As shown in FIG. 21, in either case, the sulfur storage amount of the catalyst device 30 increases as time passes, and the NOx conversion rate is reduced with the increase of the sulfur storage amount. Then, when the estimated value of the sulfur storage amount reaches the start determination value, the regeneration control is started. When the regeneration control is performed only in the first control mode, NOx cannot be converted and removed by the catalyst device 30 during the temperature raising operation; therefore, the NOx conversion rate is reduced during the regeneration control. On the other hand, when the regeneration control is performed only in the second control mode, aftertreatment of NOx by the first NOx-aftertreatment method can be continued during the temperature raising operation; therefore, a high NOx conversion rate can be obtained even during the regeneration control. However, when the regeneration control is performed only in the second control mode, release of sulfur stored in the upstream-side end portion of the catalyst support 40 is not sufficient; therefore, the amount of sulfur that remains stored in the catalyst device 30 without being released even after the regeneration control will be larger than that in the case where the regeneration control is performed only in the first control mode. Therefore, when the regeneration control is performed only in the second control mode, the NOx conversion rate of the catalyst device 30 after the regeneration control is reduced as compared with the case where the regeneration control is performed only in the first control mode. Thus, each of the regeneration controls in the first and second control modes has advantages and disadvantages, and there is still some room for improvement in reduction of the total NOx emission amount as seen on a long-term basis.

Thus, in this embodiment, the regeneration control is performed in the following manner, so that the catalyst device 30 can be favorably regenerated or recovered from sulfur poisoning, while emission of NOx during the regeneration control is curbed, and, consequently, the total NOx emission amount as seen on a long-term basis can be further reduced.

Figure 22:
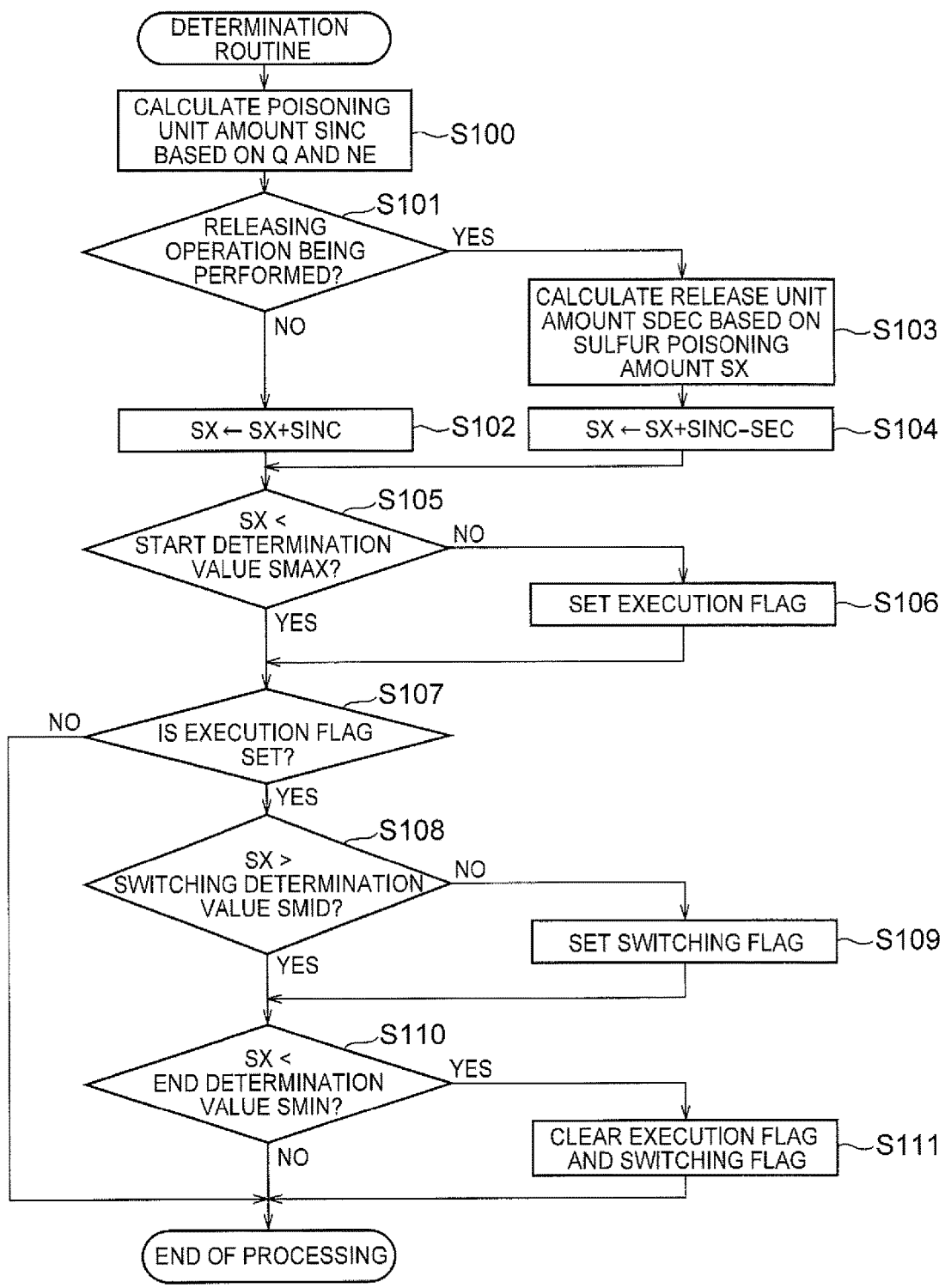
FIG. 22 is a flowchart of a determination routine executed in the emission control system of the embodiment.

FIG. 22 shows a flowchart of a determination routine for making various determinations associated with regeneration control in the emission control system of this embodiment. The processing of the routine is repeatedly executed on each specified control cycle, by the electronic control unit 37, during operation of the diesel engine.

When the processing of this routine is started, a poisoning unit amount SINC is initially calculated in step S100. The poisoning unit amount represents the amount of sulfur stored in the catalyst device 30 in a length of time corresponding to the above-indicated control cycle, namely, the rate of storage of sulfur in the catalyst device 30. In this embodiment, the poisoning unit amount SINC is calculated based on the fuel injection amount Q and engine speed NE of the diesel engine. More specifically, the value of the poisoning unit amount SINC is calculated as a value that is proportional to a value of the product of the fuel injection amount Q and the engine speed NE.

Figure 23:
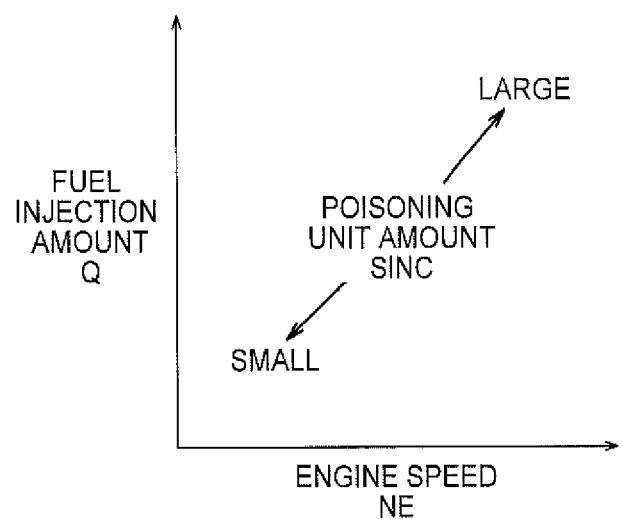
FIG. 23 is a graph indicating the relationship between the fuel injection amount and the engine speed, and the poisoning unit amount.

FIG. 23 indicates the relationship between the poisoning unit amount SINC calculated in this routine, the fuel injection amount Q and the engine speed NE. The poisoning unit amount increases as the amount (sulfur inflow amount) of sulfur in exhaust gas, which flows into the catalyst device 30 during the time corresponding to the above-indicated control cycle, increases, namely, as the amount of fuel burned during the time corresponding to the control cycle increases. Therefore, as shown in FIG. 23, the poisoning unit amount SINC is calculated so as to be a larger value as the fuel injection amount Q is larger, or the engine speed NE is higher.

Subsequently, in step S101, it is determined whether the releasing operation is being carried out. Here, when the releasing operation is not being carried out (NO), the value of the sulfur storage amount SX is updated to a value obtained by adding the poisoning unit amount SINC to the last value of the sulfur storage amount SX in step S102, and then the control proceeds to step S105. On the other hand, when the releasing operation is being carried out (YES), a release unit amount SDEC is calculated in step S103, and the value of the sulfur storage amount SX is updated to a value obtained by adding the poisoning unit amount SINC to the last value of the sulfur storage amount SX, and further subtracting the release unit amount SDEC from the result of the addition. Then, the control proceeds to step S105. The release unit amount SDEC represents the amount of sulfur released in the time corresponding to the control cycle in the releasing operation, namely, the rate of release of sulfur in the releasing operation. In this embodiment, the value of the release unit amount SDEC is calculated based on the sulfur storage amount SX.

Figure 24:
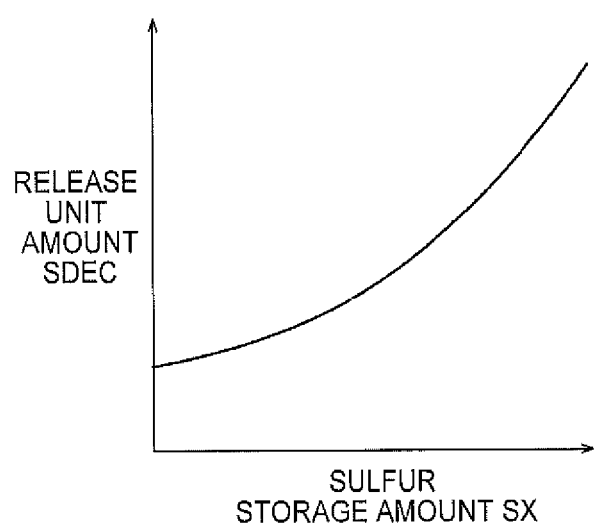
FIG. 24 is a graph indicating the relationship between the sulfur storage amount and the release unit amount.

FIG. 24 indicates the relationship between the release unit amount SDEC calculated in this routine, and the sulfur storage amount SX. As the sulfur storage amount of the catalyst device 30 is larger, the rate of release of sulfur from the catalyst device 30 becomes higher. Therefore, as shown in FIG. 24, the value of the release unit amount SDEC is calculated so as to be a larger value as the sulfur storage amount SX is larger.

When the control proceeds to step S105, it is determined in step S105 whether the sulfur storage amount SX is smaller than a specified start determination value SMAX. When the sulfur storage amount SX is equal to or larger than the start determination value SMAX (NO), an execution flag is set in step S106, and then the control proceeds to step S107. On the other hand, when the sulfur storage amount SX is smaller than the start determination value SMAX (YES), the control directly proceeds to step S107. The execution flag is set when regeneration control starts, and is cleared when the regeneration control ends.

When the control proceeds to step S107, it is determined in step S107 whether the execution flag is set. When the execution flag is not set (NO), processing of the current cycle of this routine is finished. On the other hand, when the execution flag is set (YES), the control proceeds to step S108.

When the control proceeds to step S108, it is determined in step S108 whether the sulfur storage amount SX exceeds a specified switching determination value SMID. The switching determination value SMID is set to a value that is smaller than the above-described start determination value SMAX. When the sulfur storage amount SX is equal to or smaller than the switching determination value SMID (NO), a switching flag is set in step S109, and then the control proceeds to step S110. On the other hand, when the sulfur storage amount SX exceeds the switching determination value SMID (YES), the control directly proceeds to step S110. The switching flag is set when the regeneration control switches from control in the first control mode to control in the second control mode, and is cleared when the regeneration control ends.

When the control proceeds to step S110, it is determined in step S110 whether the sulfur storage amount SX is smaller than a specified end determination value SMIN. The end determination value SMIN is set to a value that is further smaller than the above-described switching determination value SMID. When the sulfur storage amount SX is equal to or larger than the end determination value SMIN (NO), processing of the current cycle of this routine is finished. On the other hand, when the sulfur storage amount SX is smaller than the end determination value SMIN, the execution flag and the switching flag are respectively cleared in step S111, and then processing of the current cycle of this routine is finished.

Figure 25:
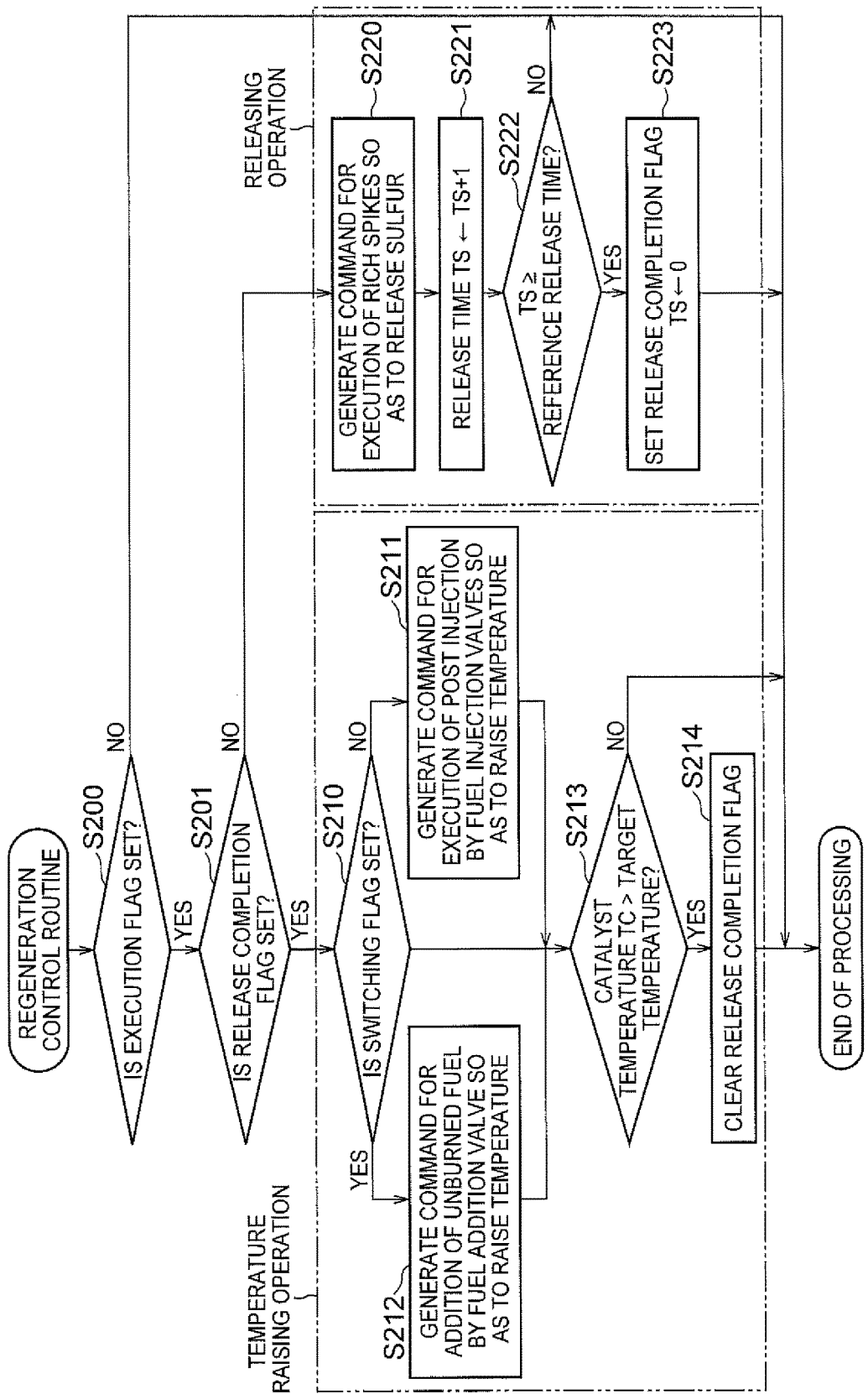
FIG. 25 is a flowchart of a regeneration control routine executed in the emission control system of the embodiment.

FIG. 25 shows a flowchart of a regeneration control routine associated with implementation of regeneration control in the emission control system of this embodiment. The processing of the routine is also repeatedly executed on each specified control cycle, by the electronic control unit 37, during operation of the diesel engine.

When the processing of this routine is started, it is initially determined in step S200 whether the execution flag is set. When the execution flag is set (YES), the control proceeds to step S201. When the execution flag is not set (NO), the processing of the current cycle of this routine is immediately finished.

When the control proceeds to step S201, it is determined in step S201 whether a release completion flag is set. The release completion flag is set each time the releasing operation performed alternately with the temperature raising operation ends in the regeneration control, and is cleared each time the temperature raising operation ends. When the release completion flag is set (YES), the control proceeds to step S210, and the temperature raising operation is performed in the processing of step S210 and subsequent steps. On the other hand, when the release completion flag is not set (NO), the control proceeds to step S220, and the releasing operation is performed in the processing of step S220 and subsequent steps.

When the control proceeds to step S210, it is determined in step S210 whether the above-described switching determination flag is set. When the switching determination flag is not set (S210: NO), a command for execution of post injection by the fuel injection valves 19 is generated so as to increase the catalyst temperature TC by the above-described first temperature raising method, and then the control proceeds to step S213. On the other hand, when the switching determination flag is set (S210: YES), a command for addition of unburned fuel by the fuel addition valve 29 is generated in step S212 so as to increase the catalyst temperature TC by the above-described second temperature raising method, and then the control proceeds to step S213.

When the control proceeds to step S213, it is determined in step S213 whether the catalyst temperature TC is higher than a target temperature in the temperature raising operation. The target temperature is set to a temperature that is slightly higher than the temperature required for release of sulfur stored in the catalyst device 30. When the catalyst temperature TC is higher than the target temperature (YES), the release completion flag is cleared in step S214, and the processing of the current cycle of this routine is finished. When the catalyst temperature TC is equal to or lower than the target temperature (NO), the current cycle of this routine is immediately finished.

On the other hand, when the release completion flag is not set (S201: NO), and the control proceeds to step S220, a command for execution of periodic rich spikes for releasing sulfur stored in the catalyst device 30 is initially generated in step S220. Then, in step S221, the value of a release time TS as a counter representing the execution time of the releasing operation in this cycle is incremented.

Subsequently, in step S222, it is determined whether the release time TS has become equal to or longer than a specified reference release time. When the release time TS is equal to or longer than the reference release time (YES), the release completion flag is set, and the value of the release time TS is reset to "0", in step S223. Then, the processing of the current cycle of this routine is finished. On the other hand, when the release time TS is shorter than the reference release time (NO), the processing of the current cycle of this routine is immediately finished.

In this embodiment, the electronic control unit 37 that performs processing of the above-described determination routine and regeneration control routine is configured to correspond to the regeneration controller. Next, the operation of the emission control system of the internal combustion engine of this embodiment configured as described above will be described.

When sulfur in exhaust gas flowing into the catalyst device 30 is stored in the basic layer 43 as described above, the basicity of the basic layer 43 weakens, and the NOx conversion rate of the catalyst device 30 is reduced. In this embodiment, when the sulfur storage amount SX of the catalyst device 30 becomes equal to or larger than the specified start determination value SMAX, the regeneration control for releasing sulfur stored in the catalyst device 30 is started.

Once the regeneration control is started, the temperature raising operation to raise the temperature of the catalyst device 30 to a temperature required for release of sulfur stored in the catalyst device 30, and the releasing operation to set the air-fuel ratio of air-fuel mixtures burned in the cylinders 11 to a value required to release sulfur stored in the catalyst device 30, are alternately and repeatedly carried out. In this embodiment, until the sulfur storage amount SX is reduced to be smaller than the switching determination value SMID, the regeneration control is performed in the first control mode in which the temperature raising operation and the releasing operation are alternately repeated, while the temperature raising operation is performed by the first temperature raising method through execution of post injection by the fuel injection valves 19. Then, after the sulfur storage amount SX becomes smaller than the switching determination value SMID, the regeneration control is performed in the second control mode in which the temperature raising operation and the releasing operation are alternately repeated, while the temperature raising operation is performed by the second temperature raising method. Namely, after switching of control to the second control mode, the temperature raising operation is performed by causing the fuel addition valve 29 to add unburned fuel, such that the HC concentration of the exhaust gas flowing into the catalyst device 30 oscillates with the amplitude within the specified range and the cycle within the specified range, which permit reducing intermediates to be produced. Then, when the sulfur storage amount SX becomes smaller than the end determination value SMIN, the regeneration control is finished. Namely, in this embodiment, control is performed in the second control mode after control in the first control mode is performed, in a period from the start of the regeneration control to the end thereof.

Figure 26:
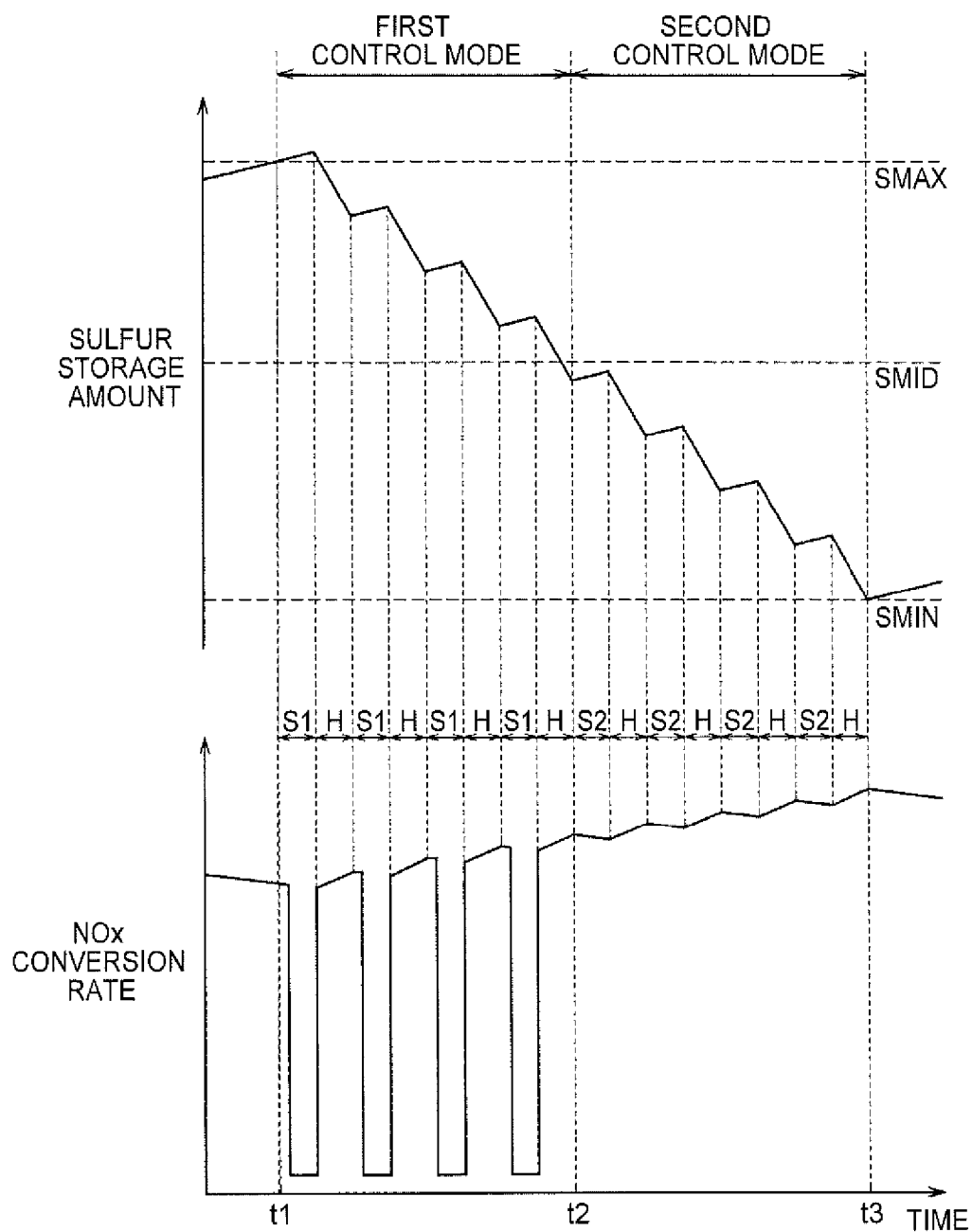
FIG. 26 is a time chart indicating changes in the sulfur storage amount of the catalyst device and the NOx conversion rate with time, during execution of regeneration control in the emission control system of the embodiment.

FIG. 26 indicates changes of the sulfur storage amount SX of the catalyst device 30 and the NOx conversion rate with time, during execution of the regeneration control as described above. In FIG. 26, the regeneration control is started at time t1, switching from control in the first control mode to control in the second control mode is conducted at time t2, and the regeneration control ends at time t3. In FIG. 26, "S1" indicates a period in which the temperature raising operation is performed by the first temperature raising method, and "S2" indicates a period in which the temperature raising operation is performed by the second temperature raising method, while "H" indicates a period in which the releasing operation is performed.

When the catalyst temperature TC rises to a high temperature region that is equal to or higher than 400° C. during execution of the temperature raising operation by the first temperature raising method, the nitrate stored in the basic layer 43 is thermally decomposed and released, which makes it impossible to store NOx in exhaust gas in the catalyst device 30. Therefore, when the temperature raising operation is performed by the first temperature raising method, it becomes impossible, in the course of the operation, to keep the NOx conversion rate at high levels.

On the other hand, during execution of the temperature raising operation by the second temperature raising method, even if the catalyst temperature TC rises to the high temperature region equal to or higher than 400° C., aftertreatment of NOx by the first NOx-aftertreatment method can be continued. Therefore, when the temperature raising operation is performed by the second temperature raising method, the NOx conversion rate is kept at high levels, from the start to the end of the temperature raising operation.

Figure 27:
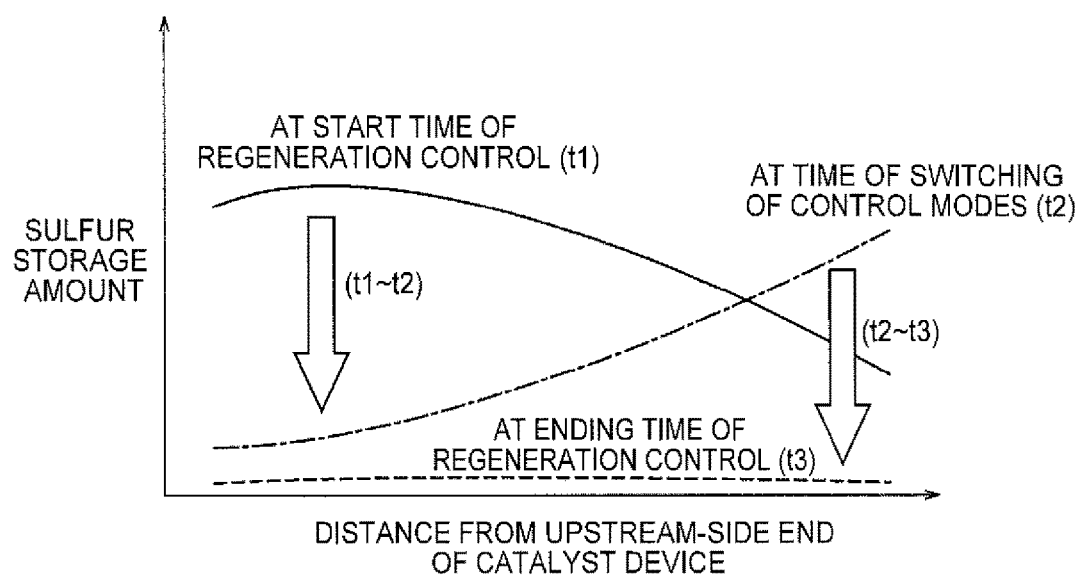
FIG. 27 is a graph indicating the sulfur storage amount of each portion of the catalyst device, at each point in time of the start time of regeneration control, the time of switching of the control mode, and the ending time of the regeneration control.

FIG. 27 indicates the sulfur storage amount of each part of the catalyst device 30, at each point of the start time (time t1) of the regeneration control, the time (time t2) of switching of the control modes, and the end time (time t3) of the regeneration control.

As described above, in the temperature raising operation by the second temperature raising method, the interval at which HC flows into the catalyst device 30 is long, and the temperature of the upstream-side end portion of the catalyst device 30 on which exhaust gas directly blows is less likely or unlikely to be increased. On the other hand, in the temperature raising operation by the first temperature raising method, the temperature of the upstream-side end portion of the catalyst device 30 can be sufficiently elevated. When the releasing operation is performed in a condition where the temperature of the whole of the catalyst device 30 becomes equal to or higher than the temperature required for release of sulfur, the release of sulfur is started from the upstream-side end portion of the catalyst device 30. Therefore, during the period in which control is performed in the first control mode after the start of the regeneration control, sulfur is released mainly in the upstream-side end portion of the catalyst device 30. Accordingly, the sulfur storage amount in the upstream-side end portion of the catalyst device 30 will be reduced, at the time of switching from control in the first control mode to control in the second control mode. In this connection, since the sulfur released from the upstream-side end portion of the catalyst device 30 moves to a downstream-side portion in the catalyst device 30, along with exhaust gas, the sulfur storage amount in the downstream-side end portion of the catalyst device 30 at this time will be increased as compared with that at the start of the regeneration control.

On the other hand, when the control is switched to the second control mode, the temperature raising operation is performed by the second temperature raising method. At this time, it becomes difficult to increase the temperature of the upstream-side end portion of the catalyst device 30. However, at this point in time, the sulfur storage amount in the upstream-side end portion of the catalyst device 30 has already been reduced, and, at this time, too, sulfur can be favorably released in the remaining downstream-side portion of the catalyst device 30. Therefore, as described above, the sulfur storage amount will be favorably reduced in the whole of the catalyst device 30, by executing control in the second control mode in the period after control is performed in the first control mode, in the period from the start to the end of the regeneration control.

FIG. 21 as described above also shows changes in the NOx conversion rate of the catalyst device and the sulfur storage amount with time when the diesel engine is operated while the regeneration control is performed in the manner of this embodiment. In this embodiment, as compared with the case where the regeneration control is performed only in the second control mode, sulfur stored in the catalyst device 30 is released more successfully under the regeneration control, and the NOx aftertreatment performance of the catalyst device 30 is recovered more successfully. Therefore, as shown in FIG. 21, in the emission control system of this embodiment, the NOx conversion rate after the regeneration control is improved, as compared with the case where the regeneration control is performed only in the second control mode. Furthermore, after switching from control in the first control mode to control in the second control mode, the NOx conversion rate can be kept at high levels even during the temperature raising operation. Therefore, as shown in FIG. 21, in the emission control system of this embodiment, the NOx conversion rate during the regeneration control is improved, as compared with the case where the regeneration control is performed only in the first control mode. In this connection, in this embodiment, the above-described switching determination value SMID is set so that the control mode is switched at the time when the sulfur storage amount of the upstream-side end portion of the catalyst device 30 is sufficiently reduced.

According to the emission control system of the internal combustion engine of this embodiment as described above, the following effects can be provided. (1) In this embodiment, the regeneration control is performed, through control in the first control mode in which the temperature raising operation and the releasing operation are alternately repeated, while the temperature raising operation is performed through execution of post injection by the fuel injection valves 19, and control in the second control mode in which the temperature raising operation and the releasing operation are alternately repeated, while the temperature raising operation is performed by executing addition of unburned fuel by the fuel addition valve 29 such that the HC concentration of the exhaust gas flowing into the catalyst device 30 oscillates with the amplitude within the specified range and the cycle within the specified range, which permit reducing intermediates to be produced. Then, the control in the second control mode is carried out in the period after the control is performed in the first control mode, in the period from the start to the end of the regeneration control. Therefore, it is possible to favorably recover the NOx conversion/removal capability of the catalyst device 30, which was reduced by sulfur poisoning, while curbing emission of NOx during the regeneration control.

(2) Since it is difficult to release sulfur from the upstream-side end portion of the catalyst device 30 under control in the second control mode, as described above, it is desirable to conduct switching to control in the second control mode, at the time when release of sulfur from the upstream-side end portion of the catalyst device 30 has sufficiently proceeded under control of the first control mode. Meanwhile, the progress of regeneration can be grasped from the amount of reduction of the sulfur storage amount SX as measured from the start of the regeneration control. In this point, in this embodiment, when the sulfur storage amount SX of the catalyst device 30 is reduced down to the specified switching determination value SMID that is set to a value smaller than the start determination value SMAX, during the regeneration control, switching from control in the first control mode to control in the second control mode is conducted. Therefore, the control mode is switched at the time when release of sulfur from the upstream-side end portion of the catalyst device 30 has sufficiently proceeded, so that the sulfur storage amount of the catalyst device 30 as a whole can be surely reduced.

(3) In this embodiment, the releasing operation is performed by periodically executing rich spikes for temporarily making the air-fuel ratio of the air-fuel mixtures burned in the cylinders 11 rich, at given time intervals. Therefore, as compared with the case where the releasing operation is performed by keeping the exhaust air-fuel ratio AFI at a value equal to or lower than the stoichiometric air-fuel ratio, emission of unburned fuel components to the ambient air can be curbed during the releasing operation.

The above-described embodiment can be modified as follows and implemented. In the above-described embodiment, the releasing operation is performed by repeatedly executing rich spikes for temporarily increasing the amount of fuel injected by the fuel injection valves 19, at given time intervals. However, the releasing operation may be performed by intermittently or continuously reducing the exhaust air-fuel ratio AFT through addition of unburned fuel by the fuel addition valve 29. The releasing operation may also be performed by continuously increasing the amount of fuel injected by the fuel injection valves 19, and keeping the base air-fuel ratio AFB at the stoichiometric air-fuel ratio or a value lower than the stoichiometric air-fuel ratio.

In the above-described embodiment, the sulfur storage amount SX of the catalyst device 30 is estimated, based on operating conditions (fuel injection amount Q, engine speed NE) of the diesel engine, and the start time of the regeneration control is determined based on the estimated sulfur storage amount SX. The start time of the regeneration control may be determined based on other parameters, such as an integrated value of the fuel injection amount Q, for example.

In the above-described embodiment, the time of switching from control in the first control mode to control in the second control mode during the regeneration control and the ending time of the regeneration control are determined, based on the estimated sulfur storage amount SX. However, these times may be determined based on other parameters, such as an elapsed time from the start of the regeneration control.

In the above-described embodiment, the control in the second control mode is performed immediately after the end of the control in the first control mode, during the regeneration control. However, control in another control mode may be performed between these controls. For example, it is considered to perform intermediate control between the first control mode and the second control mode, between the control in the first control mode and the control in the second control mode. In the intermediate control, the temperature raising operation and the releasing operation are alternately repeated, while the temperature raising operation is performed through both the post injection by the fuel injection valves 19, and addition of unburned fuel by the fuel addition valve 29.

What is claimed is:

1. An emission control system for an internal combustion engine, the internal combustion engine including a cylinder and an exhaust passage, exhaust gas emitted from the cylinder flowing in the exhaust passage, the emission control system comprising:
   a fuel injection valve configured to perform post injection of fuel into the cylinder after a combustion stroke in the internal combustion engine;
   a fuel addition valve provided in the exhaust passage and configured to add unburned fuel into the exhaust gas;
   a catalyst device provided downstream of the fuel addition valve in the exhaust passage, the catalyst device being configured to reduce nitrogen oxides in the exhaust gas through reaction of the nitrogen oxides with hydrocarbon, the catalyst device including a noble-metal catalyst supported on a support surface, and the catalyst device including an exhaust-gas contact surface around the noble-metal catalyst, the exhaust-gas contact surface being a basic surface, the catalyst device reducing the nitrogen oxides in the exhaust gas when a hydrocarbon concentration in the exhaust gas flowing into the catalyst device is oscillated with (i) an amplitude within a first specified range, and (ii) a cycle within a second specified range that is longer than a cycle of inflow of the exhaust gas into the exhaust passage during idling of the internal combustion engine, the catalyst device increasing a storage amount of the nitrogen oxides when an oscillation cycle of the hydrocarbon concentration of the exhaust gas is made longer than the second specified range; and
   an electronic control unit configured to:
      execute regeneration control such that the catalyst device recovers from sulfur poisoning, when a sulfur storage amount of the catalyst device is equal to or larger than a specified start determination value;
      in the regeneration control, alternately and repeatedly perform a temperature raising operation and a releasing operation, the temperature raising operation raising a temperature of the catalyst device to a temperature required for release of the sulfur stored in the catalyst device, and the releasing operation controlling an air-fuel ratio of an air-fuel mixture burned in the cylinder to a value required for release of the sulfur stored in the catalyst device;
      perform the regeneration control in a first control mode and in a second control mode, the first control mode being a mode in which the temperature raising operation and the releasing operation are alternately repeated while the temperature raising operation is performed through execution of the post injection of the fuel into the cylinder after the combustion stroke by the fuel injection valve, the second control mode being a mode in which the temperature raising operation and the releasing operation are alternately repeated while the temperature raising operation is performed by executing addition of unburned fuel by the fuel addition valve, such that the hydrocarbon concentration in the exhaust gas flowing into the catalyst device oscillates with (i) the amplitude within the first specified range and (ii) the cycle within the second specified range; and
      perform the regeneration control in the second control mode after performing the regeneration control in the first control mode.

2. The emission control system according to claim 1, wherein
   the electronic control unit is configured to perform switching from the first control mode to the second control mode, when the sulfur storage amount has been reduced from the start determination value to a specified switching determination value, during the regeneration control, the specified switching determination value being smaller than the start determination value.

3. The emission control system according to claim 1, wherein
   the electronic control unit is further configured to, in a period from a start of the regeneration control to a completion of the regeneration control, (1) initially perform the regeneration control in the first control mode to raise the temperature of the catalyst device to the temperature required for release of the sulfur stored in the catalyst device by executing the post injection of the fuel into the cylinder after the combustion stroke by the fuel injection valve without executing addition of unburned fuel by the fuel addition valve, and then (2) subsequently perform the regeneration control in the second control mode after performing the regeneration control in the first control mode to again raise the temperature of the catalyst device to the temperature required for release of the sulfur stored in the catalyst device by executing addition of unburned fuel by the fuel addition valve without executing the post injection of the fuel into the cylinder after the combustion stroke by the fuel injection valve.

4. An emission control method for an internal combustion engine, the internal combustion engine including an emission control system, a cylinder and an exhaust passage, exhaust gas emitted from the cylinder flowing in the exhaust passage, the emission control system including: (A) a fuel injection valve configured to perform post injection of fuel into the cylinder after a combustion stroke in the internal combustion engine, (B) a fuel addition valve provided in the exhaust passage and configured to add unburned fuel into the exhaust gas, (C) a catalyst device provided downstream of the fuel addition valve in the exhaust passage, the catalyst device being configured to reduce nitrogen oxides in the exhaust gas through reaction of the nitrogen oxides with hydrocarbon, the catalyst device including a noble-metal catalyst supported on a support surface, and the catalyst device including an exhaust-gas contact surface around the noble-metal catalyst, the exhaust-gas contact surface being a basic surface, the catalyst device reducing the nitrogen oxides in the exhaust gas when a hydrocarbon concentration in the exhaust gas flowing into the catalyst device is oscillated with (i) an amplitude within a first specified range, and (ii) a cycle within a second specified range that is longer than a cycle of inflow of the exhaust gas into the exhaust passage during idling of the internal combustion engine, the catalyst device increasing a storage amount of the nitrogen oxides when an oscillation cycle of the hydrocarbon concentration of the exhaust gas is made longer than the second specified range, the exhaust control method comprising:
   executing regeneration control such that the catalyst device recovers from sulfur poisoning, when a sulfur storage amount of the catalyst device is equal to or larger than a specified start determination value;
   in the regeneration control, alternately and repeatedly performing a temperature raising operation and a releasing operation, the temperature raising operation raising a temperature of the catalyst device to a temperature required for release of the sulfur stored in the catalyst device, and the releasing operation controlling an air-fuel ratio of an air-fuel mixture burned in the cylinder to a value required for release of the sulfur stored in the catalyst device;

performing the regeneration control in a first control mode and in a second control mode, the first control mode being a mode in which the temperature raising operation and the releasing operation are alternately repeated while the temperature raising operation is performed through execution of the post injection of the fuel into the cylinder after the combustion stroke by the fuel injection valve, the second control mode being a mode in which the temperature raising operation and the releasing operation are alternately repeated while the temperature raising operation is performed by executing addition of unburned fuel by the fuel addition valve, such that the hydrocarbon concentration in the exhaust gas flowing into the catalyst device oscillates with (i) the amplitude within the first specified range and (ii) the cycle within the second specified range; and performing the regeneration control in the second control mode after performing the regeneration control in the first control mode.

5. The emission control method according to claim 4, wherein executing the regeneration control includes, in a period from a start of the regeneration control to a completion of the regeneration control, (1) initially performing the regeneration control in the first control mode to raise the temperature of the catalyst device to the temperature required for release of the sulfur stored in the catalyst device by executing the post injection of the fuel into the cylinder after the combustion stroke by the fuel injection valve without executing addition of unburned fuel by the fuel addition valve, and then (2) subsequently performing the regeneration control in the second control mode after performing the regeneration control in the first control mode to again raise the temperature of the catalyst device to the temperature required for release of the sulfur stored in the catalyst device by executing addition of unburned fuel by the fuel addition valve without executing the post injection of the fuel into the cylinder after the combustion stroke by the fuel injection valve.

* * * * *